United States Patent
Wu et al.

(10) Patent No.: US 11,611,967 B2
(45) Date of Patent: Mar. 21, 2023

(54) SCRAMBLING-BASED DATA TRANSMISSION METHOD

(71) Applicant: HUAWEI TECHNOLOGIES CO., LTD., Guangdong (CN)

(72) Inventors: Yiqun Wu, Shanghai (CN); Yan Chen, Shanghai (CN); Lei Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/935,627

(22) Filed: Jul. 22, 2020

(65) Prior Publication Data

US 2020/0351883 A1 Nov. 5, 2020

Related U.S. Application Data

(63) Continuation of application No. PCT/CN2019/071266, filed on Jan. 11, 2019.

(30) Foreign Application Priority Data

Jan. 24, 2018 (CN) .......................... 201810068905.0

(51) Int. Cl.
*H04W 56/00* (2009.01)
*H04W 72/044* (2023.01)
(Continued)

(52) U.S. Cl.
CPC ...... *H04W 72/0466* (2013.01); *H04B 7/0456* (2013.01); *H04L 27/2607* (2013.01);
(Continued)

(58) Field of Classification Search
CPC ............. H04W 72/0466; H04W 76/11; H04W 72/0446; H04W 72/0453; H04B 7/0456; H04L 27/2607; H04L 27/2636
(Continued)

(56) References Cited

U.S. PATENT DOCUMENTS 5,528,516 A * 6/1996 Yemini ............... G06F 11/2257
702/119
2010/0027608 A1* 2/2010 Priotti ............... H04L 25/03866
375/267
(Continued)

FOREIGN PATENT DOCUMENTS

CN 102067645 A 5/2011
CN 102387566 A 3/2012
(Continued)

OTHER PUBLICATIONS

Samsung, "Procedures for UL Transmissions," 3GPP TSG RAN WG1 #90bis, R1-1717665, Prague, CZ, Oct. 9-13, 2017, 10 pages.
(Continued)

*Primary Examiner* — Sai Ming Chan
(74) *Attorney, Agent, or Firm* — Fish & Richardson P.C.

(57) ABSTRACT

This application provides example scrambling-based data transmission methods and apparatuses. A scrambling manner is determined based on a sending waveform. The scrambling manner can include frequency domain scrambling, time domain scrambling, or time-frequency domain scrambling. To-be-scrambled data can be scrambled based on the scrambling manner, to obtain scrambled output data. The scrambled output data can be sent. The sending waveform can be a discrete Fourier transform spreading orthogonal frequency division multiplexing (DFT-s-OFDM) waveform or a cyclic prefix orthogonal frequency division multiplexing (CP-OFDM) waveform.

17 Claims, 17 Drawing Sheets

(51) Int. Cl.
*H04W 76/11* (2018.01)
*H04B 7/0456* (2017.01)
*H04L 27/26* (2006.01)
*H04W 72/0446* (2023.01)
*H04W 72/0453* (2023.01)

(52) U.S. Cl.
CPC ..... *H04L 27/2636* (2013.01); *H04W 72/0446* (2013.01); *H04W 72/0453* (2013.01); *H04W 76/11* (2018.02)

(58) Field of Classification Search
USPC .......................................................... 360/329
See application file for complete search history.

(56) References Cited

U.S. PATENT DOCUMENTS

| | | | | |
|---|---|---|---|---|
| 2012/0033630 | A1* | 2/2012 | Chung | H04B 7/0684 370/329 |
| 2016/0241890 | A1* | 8/2016 | Park | H04N 21/23 |
| 2016/0366717 | A1* | 12/2016 | Yang | H04W 72/0406 |
| 2017/0238309 | A1 | 8/2017 | Han et al. | |
| 2018/0124796 | A1* | 5/2018 | Noh | H04B 1/1027 |
| 2019/0110295 | A1* | 4/2019 | Park | H04L 27/2684 |

FOREIGN PATENT DOCUMENTS

| | | | |
|---|---|---|---|
| CN | 103929803 | A | 7/2014 |
| CN | 104798329 | A | 7/2015 |
| CN | 108111253 | A | 6/2018 |
| EP | 2922225 | A1 | 9/2015 |

OTHER PUBLICATIONS

Qualcomm Incorporated, "RSMA and SCMA comparison," 3GPP TSG-RAN WG1 #86, R1-166358, Gothenburg, Sweden, Aug. 22-26, 2016, 11 pages.

PCT International Search Report and Written Opinion issued in International Application No. PCT/CN2019/071266 dated Mar. 27, 2019, 17 pages (with English translation).

Extended European Search Report issued in European Application No. 19744044.9 dated Feb. 11, 2021, 9 pages.

MediaTek Inc., "Remaining issues in codeword mapping," 3GPP TSG RAN WG1 Meeting AH 1801, R1-1801007, Vancouver, Canada, Jan. 22-26, 2018, 8 pages.

Office Action issued in Chinese Application No. 201810068905.0 dated Sep. 18, 2021, 6 pages.

* cited by examiner

SCRAMBLING-BASED DATA TRANSMISSION METHOD

CROSS-REFERENCE TO RELATED APPLICATIONS

This application is a continuation of International Application No. PCT/CN2019/071266, filed on Jan. 11, 2019, which claims priority to Chinese Patent Application No. 201810068905.0, filed on Jan. 24, 2018. The disclosures of the aforementioned applications are hereby incorporated by reference in their entireties.

TECHNICAL FIELD

This application relates to the field of communications technologies, and in particular, to a scrambling-based data transmission method and an apparatus.

BACKGROUND

In a wireless communications system, a multiple access technology may be introduced. In a wireless communications system that supports multiple access, a plurality of terminals may be supported in accessing a same network device and performing data transmission with the network device. Based on orthogonality, multiple access may include orthogonal multiple access and non-orthogonal multiple access (NOMA). Based on a resource multiplexing manner, multiple access may include code division multiple access (CDMA), time division multiple access (TDMA), frequency division multiple access (FDMA), and space division multiple access (SDMA).

With development of wireless communications technologies, in the wireless communications system that supports the multiple access, a communication service volume significantly increases. Therefore, how to improve transmission efficiency of the wireless communications system that supports the multiple access needs to be studied.

SUMMARY

According to a first aspect, this application provides a scrambling-based data transmission method, including: determining a scrambling manner based on a sending waveform; scrambling to-be-scrambled data based on the scrambling manner, to obtain scrambled output data; and sending the scrambled output data. For example, the scrambling manner includes one or more of the following: frequency domain scrambling, time domain scrambling, or time-frequency domain scrambling. For example, if the sending waveform is a discrete Fourier transform spreading orthogonal frequency division multiplexing DFT-s-OFDM waveform, the scrambling manner is the time domain scrambling. For another example, if the sending waveform is a cyclic prefix orthogonal frequency division multiplexing CP-OFDM waveform, the scrambling manner is the time domain scrambling, the frequency domain scrambling, or the time-frequency domain scrambling. According to the method, the scrambling manner may be determined based on the sending waveform, so that to-be-sent data obtained based on the scrambling manner may have a low peak-to-average power ratio (PAPR), or a PAPR of to-be-sent data obtained based on the scrambling manner may not be increased, thereby improving data transmission efficiency.

In a first design, according to the first aspect, the determining a scrambling manner based on a sending waveform includes: determining the scrambling manner based on the sending waveform and a type of a preprocessing codebook. For example, if the sending waveform is a CP-OFDM waveform and the type of the preprocessing codebook is an extended sequence, the scrambling manner is frequency domain scrambling. For another example, if the sending waveform is a DFT-s-OFDM waveform and the type of the preprocessing codebook is an extended sequence, the scrambling manner is time domain scrambling. According to the method, the scrambling manner may be determined based on the sending waveform and the type of the preprocessing codebook, so that to-be-sent data obtained based on the scrambling manner and the preprocessing codebook may have a low peak-to-average power ratio (PAPR), or a PAPR of to-be-sent data obtained based on the scrambling manner and the preprocessing codebook may not be increased, thereby improving data transmission efficiency.

In a second design, according to the first aspect or the first design of the first aspect, the scrambling to-be-scrambled data based on the scrambling manner, to obtain scrambled output data includes: scrambling the to-be-scrambled data based on a scrambling sequence and the scrambling manner, to obtain the scrambled output data, where the scrambling sequence is determined based on a first sequence, an initial value of the first sequence is determined based on a UE group identifier of UE, and the scrambled output data is data corresponding to the UE. According to the method, interference between data of different UE groups can be reduced.

In a third design, according to any one of the first aspect or the foregoing designs of the first aspect, the method further includes: determining the sending waveform. When the sending waveform is determined, the sending waveform may be determined based on a reference signal RS. For example, the sending waveform may be determined based on an RS pattern configuration, or the sending waveform may be determined based on a sequence type or a sequence value of the RS, or the sending waveform may be determined based on a port of the RS. When the sending waveform is determined, the sending waveform may be further determined based on the preprocessing codebook. For example, the sending waveform may be determined based on the preprocessing codebook and a correspondence between the sending waveform and the preprocessing codebook.

According to a second aspect, this application provides a scrambling-based data transmission method, including: receiving scrambled data; determining a scrambling manner based on a transmission waveform; and descrambling the received scrambled data based on the scrambling manner. For example, the scrambling manner includes one or more of the following: frequency domain scrambling, time domain scrambling, or time-frequency domain scrambling. For example, if the transmission waveform is a discrete Fourier transform spreading orthogonal frequency division multiplexing DFT-s-OFDM waveform, the scrambling manner is the time domain scrambling. For another example, if the transmission waveform is a cyclic prefix orthogonal frequency division multiplexing CP-OFDM waveform, the scrambling manner is the time domain scrambling, the frequency domain scrambling, or the time-frequency domain scrambling.

In a first design, according to the second aspect, the determining a scrambling manner based on a transmission waveform includes: determining the scrambling manner based on the transmission waveform and a type of a preprocessing codebook. For example, if the transmission waveform is a CP-OFDM waveform and the type of the preprocessing codebook is an extended sequence, the scrambling manner is frequency domain scrambling. For another example, if the transmission waveform is a DFT-s-OFDM waveform and the type of the preprocessing codebook is an extended sequence, the scrambling manner is time domain scrambling.

In a second design, according to the second aspect or the first design of the second aspect, the descrambling the received scrambled data based on the scrambling manner includes: descrambling the received scrambled data based on a scrambling sequence and the scrambling manner, where the scrambling sequence is determined based on a first sequence, an initial value of the first sequence is determined based on a UE group identifier of UE, and the scrambled data is data corresponding to the UE.

In a third design, according to any one of the second aspect or the foregoing designs of the second aspect, the method further includes: determining the transmission waveform. When the transmission waveform is determined, the transmission waveform may be determined based on a reference signal RS. For example, the transmission waveform may be determined based on an RS pattern configuration, or the transmission waveform may be determined based on a sequence type or a sequence value of the RS, or the transmission waveform may be determined based on a port of the RS. When the transmission waveform is determined, the transmission waveform may be further determined based on the preprocessing codebook. For example, the transmission waveform may be determined based on the preprocessing codebook and a correspondence between the transmission waveform and the preprocessing codebook.

According to a third aspect, an embodiment of this application provides an apparatus, including: a first determining module, configured to determine a scrambling manner based on a sending waveform; a scrambling module, configured to: scramble to-be-scrambled data based on the scrambling manner, to obtain scrambled output data and a communications module, configured to send the scrambled output data. For example, the scrambling manner includes one or more of the following: frequency domain scrambling, time domain scrambling, or time-frequency domain scrambling. For example, if the sending waveform is a discrete Fourier transform spreading orthogonal frequency division multiplexing DFT-s-OFDM waveform, the first determining module determines that the scrambling manner is the time domain scrambling. For another example, if the sending waveform is a cyclic prefix orthogonal frequency division multiplexing CP-OFDM waveform, the first determining module determines that the scrambling manner is the time domain scrambling, the frequency domain scrambling, or the time-frequency domain scrambling.

In a first design, according to the third aspect, that the first determining module determines the scrambling manner based on the sending waveform includes: the first determining module determines the scrambling manner based on the sending waveform and a type of a preprocessing codebook. For example, if the sending waveform is a CP-OFDM waveform and the type of the preprocessing codebook is an extended sequence, the first determining module determines that the scrambling manner is frequency domain scrambling. For another example, if the sending waveform is a DFT-s-OFDM waveform and the type of the preprocessing codebook is an extended sequence, the first determining module determines that the scrambling manner is time domain scrambling.

In a second design, according to the third aspect or the first design of the third aspect, that the scrambling module scrambles the to-be-scrambled data based on the scrambling manner, to obtain the scrambled output data includes: the scrambling module scrambles the to-be-scrambled data based on a scrambling sequence and the scrambling manner, to obtain the scrambled output data, where the scrambling sequence is determined based on a first sequence, an initial value of the first sequence is determined based on a UE group identifier of UE, and the scrambled output data is data corresponding to the UE.

In a third design, according to any one of the third aspect or the foregoing designs of the third aspect, the apparatus further includes: a second determining module, configured to determine the sending waveform. The second determining module may determine the sending waveform based on a reference signal RS. For example, the second determining module may determine the sending waveform based on an RS pattern configuration, or may determine the sending waveform based on a sequence type or a sequence value of the RS, or may determine the sending waveform based on a port of the RS. The second determining module may further determine the sending waveform based on the preprocessing codebook. For example, the second determining module may determine the sending waveform based on the preprocessing codebook and a correspondence between the sending waveform and the preprocessing codebook.

According to a fourth aspect, this application provides an apparatus, and the apparatus can implement one or more functions in the first aspect and the designs of the first aspect. The functions may be implemented by using hardware, software, or a combination of hardware and software. The hardware or the software includes one or more modules corresponding to the foregoing functions. In an example, the apparatus includes a processor, a memory, and a transceiver. The memory is coupled to the processor, and the processor executes a program instruction stored in the memory. The processor is coupled to the transceiver, and the processor sends and/or receives a signal by using the transceiver. In another example, the apparatus includes a processor and a memory. The memory is coupled to the processor, and the processor executes a program instruction stored in the memory. The processor generates and sends a signal, and/or receives and processes a signal.

In a first design, the processor is configured to determine a scrambling manner based on a sending waveform. The processor is further configured to: scramble to-be-scrambled data based on the scrambling manner, obtain scrambled output data, and send the scrambled output data. For example, the scrambling manner includes one or more of the following: frequency domain scrambling, time domain scrambling, or time-frequency domain scrambling. For example, if the sending waveform is a discrete Fourier transform spreading orthogonal frequency division multiplexing DFT-s-OFDM waveform, the processor determines that the scrambling manner is the time domain scrambling. For another example, if the sending waveform is a cyclic prefix orthogonal frequency division multiplexing CP-OFDM waveform, the processor determines that the scrambling manner is the time domain scrambling, the frequency domain scrambling, or the time-frequency domain scrambling.

In a second design, according to the fourth aspect or the first design of the fourth aspect, that the processor determines the scrambling manner based on the sending waveform includes: the processor determines the scrambling manner based on the sending waveform and a type of a preprocessing codebook. For example, if the sending waveform is a CP-OFDM waveform and the type of the preprocessing codebook is an extended sequence, the processor determines that the scrambling manner is frequency domain scrambling. For another example, if the sending waveform is a DFT-s-OFDM waveform and the type of the preprocessing codebook is an extended sequence, the processor determines that the scrambling manner is time domain scrambling.

In a third design, according to any one of the fourth aspect or the foregoing designs of the fourth aspect, that the processor scrambles the to-be-scrambled data based on the scrambling manner, to obtain the scrambled output data includes: the processor scrambles the to-be-scrambled data based on a scrambling sequence and the scrambling manner, to obtain scrambled output data, where the scrambling sequence is determined based on a first sequence, an initial value of the first sequence is determined based on a UE group identifier of UE, and the scrambled output data is data corresponding to the UE.

In a fourth design, according to any one of the fourth aspect or the foregoing designs of the fourth aspect, the processor is further configured to determine the sending waveform. The processor may determine the sending waveform based on a reference signal RS. For example, the processor may determine the sending waveform based on an RS pattern configuration, or may determine the sending waveform based on a sequence type or a sequence value of the RS, or may determine the sending waveform based on a port of the RS. The processor may further determine the sending waveform based on the preprocessing codebook. For example, the processor may determine the sending waveform based on the preprocessing codebook and a correspondence between the sending waveform and the preprocessing codebook.

According to a fifth aspect, an embodiment of this application provides an apparatus, including: a communications module, configured to receive scrambled data; a first determining module, configured to determine a scrambling manner based on a transmission waveform; and a descrambling module, configured to descramble the received scrambled data based on the scrambling manner. For example, the scrambling manner includes one or more of the following: frequency domain scrambling, time domain scrambling, or time-frequency domain scrambling. For example, if the transmission waveform is a discrete Fourier transform spreading orthogonal frequency division multiplexing DFT-s-OFDM waveform, the first determining module determines that the scrambling manner is the time domain scrambling. For another example, if the transmission waveform is a cyclic prefix orthogonal frequency division multiplexing CP-OFDM waveform, the first determining module determines that the scrambling manner is the time domain scrambling, the frequency domain scrambling, or the time-frequency domain scrambling.

In a first design, according to the fifth aspect, that the first determining module determines the scrambling manner based on the transmission waveform includes: the first determining module determines the scrambling manner based on the transmission waveform and a type of a preprocessing codebook. For example, if the transmission waveform is a CP-OFDM waveform and the type of the preprocessing codebook is an extended sequence, the first determining module determines that the scrambling manner is frequency domain scrambling. For another example, if the transmission waveform is a DFT-s-OFDM waveform and the type of the preprocessing codebook is an extended sequence, the first determining module determines that the scrambling manner is time domain scrambling.

In a second design, according to the fifth aspect or the first design of the fifth aspect, that the descrambling module descrambles the received scrambled data based on the scrambling manner includes: the descrambling module descrambles the received scrambled data based on a scrambling sequence and the scrambling manner, where the scrambling sequence is determined based on a first sequence, an initial value of the first sequence is determined based on a UE group identifier of UE, and the scrambled data is data corresponding to the UE.

In a third design, according to any one of the fifth aspect or the foregoing designs of the fifth aspect, the apparatus further includes: a second determining module, configured to determine the transmission waveform. The second determining module may determine the transmission waveform based on a reference signal RS. For example, the second determining module may determine the transmission waveform based on an RS pattern configuration, or may determine the transmission waveform based on a sequence type or a sequence value of the RS, or may determine the transmission waveform based on a port of the RS. The second determining module may further determine the transmission waveform based on the preprocessing codebook. For example, the second determining module may determine the transmission waveform based on the preprocessing codebook and a correspondence between the transmission waveform and the preprocessing codebook.

According to a sixth aspect, this application provides an apparatus, and the apparatus can implement one or more functions in the second aspect and the designs of the second aspect. The functions may be implemented by using hardware, software, or a combination of hardware and software. The hardware or the software includes one or more modules corresponding to the foregoing functions. In an example, the apparatus includes a processor, a memory, and a transceiver. The memory is coupled to the processor, and the processor executes a program instruction stored in the memory. The processor is coupled to the transceiver, and the processor sends and/or receives a signal by using the transceiver. In another example, the apparatus includes a processor and a memory. The memory is coupled to the processor, and the processor executes a program instruction stored in the memory. The processor generates and sends a signal, and/or receives and processes a signal.

In a first design, according to the sixth aspect, the processor receives scrambled data determines a scrambling manner based on a transmission waveform, and descrambles the received scrambled data based on the scrambling manner. For example, the scrambling manner includes frequency domain scrambling, time domain scrambling, or time-frequency domain scrambling. For example, if the transmission waveform is a discrete Fourier transform spreading orthogonal frequency division multiplexing DFT-s-OFDM waveform, the processor determines that the scrambling manner is the time domain scrambling. For another example, if the transmission waveform is a cyclic prefix orthogonal frequency division multiplexing CP-OFDM waveform, the processor determines that the scrambling manner is the time domain scrambling, the frequency domain scrambling, or the time-frequency domain scrambling.

In a second design, according to the sixth aspect or the first design of the sixth aspect, that the processor determines the scrambling manner based on the transmission waveform includes: the processor determines the scrambling manner based on the transmission waveform and a type of a preprocessing codebook. For example, if the transmission waveform is a CP-OFDM waveform and the type of the preprocessing codebook is an extended sequence, the processor determines that the scrambling manner is frequency domain scrambling. For another example, if the transmission waveform is a DFT-s-OFDM waveform and the type of the preprocessing codebook is an extended sequence, the processor determines that the scrambling manner is time domain scrambling.

In a third design, according to any one of the sixth aspect or the foregoing designs of the sixth aspect, that the processor descrambles the received scrambled data based on the scrambling manner includes: the processor descrambles the received scrambled data based on a scrambling sequence and the scrambling manner, where the scrambling sequence is determined based on a first sequence, an initial value of the first sequence is determined based on a UE group identifier of UE, and the scrambled data is data corresponding to the UE.

In a fourth design, according to any one of the sixth aspect or the foregoing designs of the sixth aspect, the processor is further configured to determine the transmission waveform. The processor may determine the transmission waveform based on a reference signal RS. For example, the processor may determine the transmission waveform based on an RS pattern configuration, or may determine the transmission waveform based on a sequence type or a sequence value of the RS, or may determine the transmission waveform based on a port of the RS. The processor may further determine the transmission waveform based on the preprocessing codebook. For example, the processor may determine the transmission waveform based on the preprocessing codebook and a correspondence between the transmission waveform and the preprocessing codebook.

According to a seventh aspect, this application provides a computer program product including an instruction. When the instruction is run on a computer, the computer is enabled to perform one or more functions in the first aspect and the designs of the first aspect.

According to an eighth aspect, this application provides a computer program product including an instruction. When the instruction is run on a computer, the computer is enabled to perform one or more functions in the second aspect and the designs of the second aspect.

According to a ninth aspect, this application provides a communications system, including the apparatus in any one of the third aspect or the designs of the third aspect, and the apparatus in any one of the fifth aspect or the designs of the fifth aspect.

According to a tenth aspect, this application provides a communications system, including the apparatus in any one of the fourth aspect or the designs of the fourth aspect, and the apparatus in any one of the sixth aspect or the designs of the sixth aspect.

DESCRIPTION OF EMBODIMENTS

Figure 1:
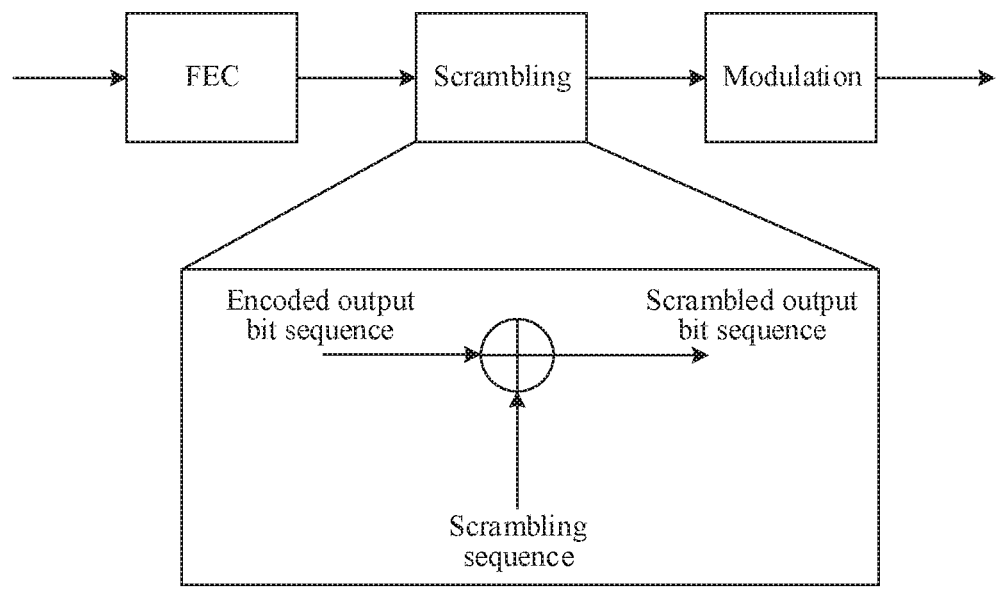
FIG. 1 is a flowchart of scrambling-based data transmission according to an embodiment of this application.

The technical solutions provided in embodiments of this application may be applied to various communications systems such as a fifth generation mobile communications system (5G), a long term evolution (LTE) system, and a future communications system. 5G may also be referred to as new radio (NR).

A wireless communications system includes a communications device, and the communications devices may perform wireless communication by using an air interface resource. The communications device may include a network device and a terminal device, and the network device may also be referred to as a network side device. The air interface resource may include at least one of a time domain resource, a frequency domain resource, a code resource, and a space resource.

The terminal device in the embodiments of this application may also be referred to as a terminal, and may be a device having wireless receiving and sending functions. The terminal device may be deployed on land, and includes an indoor device, an outdoor device, a handheld device, or a vehicle-mounted device. The terminal device may alternatively be deployed on a water surface (for example, a ship). The terminal device may alternatively be deployed in the air (for example, on aircrafts, balloons, or satellites). The terminal device may be user equipment (UE), and the UE includes a handheld device, a vehicle-mounted device, a wearable device, or a computing device that has a wireless communication function. For example, the UE may be a mobile phone, a tablet computer, or a computer having wireless receiving and sending functions. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In the embodiments of this application, an apparatus for implementing a function of the terminal may be a terminal, or may be an apparatus that supports the terminal in implementing the function. In the embodiments of this application, the technical solutions provided in the embodiments of this application are described by using an example in which the apparatus for implementing the function of the terminal is a terminal and the terminal is UE.

The network device in the embodiments of this application includes a base station (BS), and may be a device that is deployed in a radio access network and that can perform wireless communication with the terminal. The base station may be in a plurality of forms, such as a macro base station, a micro base station, a relay node, and an access point. For example, the base station in the embodiments of this application may be a base station in 5G or a base station in LTE. The base station in 5G may also be referred to as a transmission reception point (TRP) or a gNB. In the embodiments of this application, an apparatus for implementing a function of the network device may be a network device, or may be an apparatus that supports the network device in implementing the function. In the embodiments of this application, the technical solutions provided in the embodiments of this application are described by using an example in which the apparatus for implementing the function of the network device is a network device and the network device is a base station.

The technical solutions provided in the embodiments of this application may be applied to wireless communication between communications devices. The wireless communication between the communications devices may include wireless communication between a network device and a terminal, wireless communication between network devices, and wireless communication between terminals. In the embodiments of this application, the term "wireless communication" may also be referred to as "communication" for short, and the term "communication" may also be referred to as "data transmission", "information transmission", or "transmission". In the wireless communications system, when wireless communication is performed between communications devices, a communications device that sends data may also be referred to as a transmit end, and a communications device that receives data may also be referred to as a receive end. An example in which the base station communicates with the UE is used. When the base station sends data to the UE, and the UE receives the data sent by the base station, the base station may also be referred to as a transmit end, and the UE may also be referred to as a receive end. When the UE sends data to the base station, and the base station receives the data sent by the UE, the UE may also be referred to as a transmit end, and the base station may also be referred to as a receive end.

When performing data transmission, the transmit end may scramble to-be-sent data based on a scrambling sequence, to reduce interference between transmitted data and improve a decoding correct rate of the receive end, thereby improving data transmission efficiency. In the embodiments of this application, the data sent by the transmit end may be referred to as to-be-sent data, and the to-be-sent data may be data that can be sent on an air interface. Alternatively, the to-be-sent data may be data that can be sent on an air interface after being processed. This is not limited in this application. The to-be-sent data that is scrambled when scrambling processing is performed may also be referred to as to-be-scrambled data, scrambled input data, or another name. This is not limited in this application. For example, uplink transmission between the base station and the UE is used as an example. UE A and UE B may separately scramble respective data by using different scrambling sequences, so that interference between the data of the UE A and the data of the UE B is reduced. When the UE A and the UE B separately send respective scrambled data to the base station, and the base station demodulates the data of the UE A and the data of the UE B, a decoding correct rate can be improved, thereby improving system transmission efficiency.

In the embodiments of this application, the transmit end may scramble and send various types of to-be-scrambled data. The method may be referred to as scrambling-based data transmission method.

For example, FIG. 1 is a flowchart in which the transmit end scrambles and sends a bit. As shown in FIG. 1, this processing procedure includes forward error correction (FEC), scrambling, and modulation.

When performing the FEC, the transmit end encodes an input bit to obtain an encoded output bit, so that a receive end can detect or correct a bit error, thereby enhancing data transmission reliability. When performing the FEC, the transmit end may encode the input bit by using a forward error correction code commonly used in the art. A common forward error correction code may be a convolutional code, a block code, a turbo code, an LDPC (low density parity check) code, or a polar code.

When performing the scrambling, the transmit end scrambles an encoded output bit sequence by using a scrambling sequence, to obtain a scrambled output bit sequence. The scrambling an encoded output bit sequence by using a scrambling sequence may include: adding the scrambling sequence to the encoded output bit sequence, or multiplying the scrambling sequence by the encoded output bit sequence. For example, as shown in FIG. 1, the scrambling sequence is added to the encoded output bit sequence. The encoded output bit sequence includes one or more encoded output bits, the scrambled output bit sequence includes one or more scrambled output bits, and the scrambling sequence may include one or more bits. In the embodiments of this application, at least one may include one or more, and a plurality of may include two, three, four, or more. This is not limited in this application.

When performing the modulation, the transmit end modulates the scrambled bit based on a modulation scheme, to obtain a modulation symbol. In the embodiments of this application, the modulation scheme may also be referred to as a modulation method or another name. This is not limited in this application. For example, the modulation scheme may include quadrature amplitude modulation (QAM), and the QAM modulation may include at least one of binary phase shift keying (BPSK), quadrature phase shift keying (QPSK), 16QAM, 64QAM, 256QAM, and 1024QAM. The transmit end may send the modulation symbol to the receive end.

Figure 2:
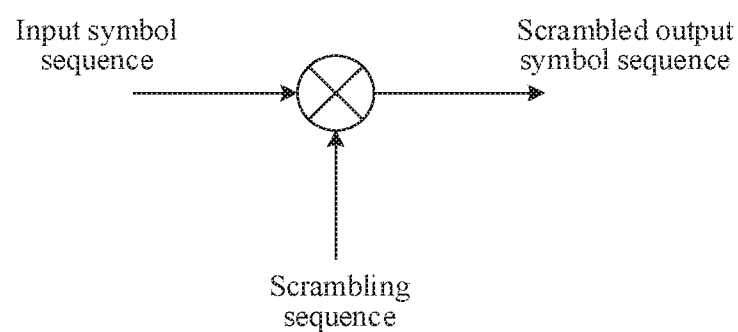
FIG. 2 is a flowchart of scrambling-based data transmission according to an embodiment of this application.

For another example, FIG. 2 is a flowchart in which the transmit end scrambles and sends a symbol. As shown in FIG. 2, in this processing procedure, the transmit end scrambles an input symbol sequence to obtain a scrambled output symbol sequence. The scrambled output symbol sequence includes one or more scrambled output symbols, and the transmit end may send a symbol in the scrambled output symbol sequence to a receive end. Symbols in the input symbol sequence are complex numbers. The symbols may be various types of symbols. For example, the symbols may be modulation symbols that are modulated, or may be preprocessed output symbols that are preprocessed. This is not limited in this application. A scrambling sequence may include one or more complex number symbols. The scrambling an input symbol sequence may include: adding the scrambling sequence to the input symbol sequence, or multiplying the scrambling sequence by the input symbol sequence. For example, as shown in FIG. 2, the scrambling sequence is multiplied by the input symbol sequence.

In the scrambling in the embodiments of this application, for example, in the scrambling procedure in FIG. 1 or FIG. 2, when the to-be-scrambled data is scrambled by using the scrambling sequence, the scrambling sequence may be added to a to-be-scrambled data sequence, to obtain a scrambled output sequence. For example, the to-be-scrambled data sequence is $A=[a_1, a_2, \ldots, a_N]$. To be specific, an $i^{th}$ element in the to-be-scrambled data sequence A is $a_i$, where $i=1, 2, \ldots, N$. The scrambling sequence is $\overline{S}=[s_1, s_2, \ldots, s_N]$. To be specific, an $i^{th}$ element in the scrambling sequence $\overline{S}$ is $s_i$, where $i=1, 2, \ldots, N$. As a result, an $i^{th}$ element in the scrambled output sequence is $b_i=a_i+s_i$, where $i=1, 2, \ldots, N$. In the embodiments of this application, the to-be-scrambled data sequence may also be referred to as a to-be-scrambled sequence or another name. This is not limited in this application.

In the scrambling in the embodiments of this application, for example, in the scrambling procedure in FIG. 1 or FIG. 2, when the to-be-scrambled data is scrambled by using the scrambling sequence, the scrambling sequence may alternatively be multiplied by the to-be-scrambled data sequence, to obtain the scrambled output sequence. For example, the to-be-scrambled data sequence is $A=[a_1, a_2, \ldots, a_N]$. To be specific, an $i^{th}$ element in the to-be-scrambled data sequence A is $a_i$, where $i=1, 2, \ldots, N$. The scrambling sequence is $\overline{S}=[s_1, s_2, \ldots, s_N]$. To be specific, an $i^{th}$ element in the scrambling sequence $\overline{S}$ is $s_i$, where $i=1, 2, \ldots, N$. As a result, an $i^{th}$ element in the scrambled output sequence is $b_i=a_i \otimes s_1$, where $i=1, 2, \ldots, N$.

Further, in the scrambling in the embodiments of this application, for example, in the scrambling procedure shown in FIG. 1 or FIG. 2, when the to-be-scrambled data is scrambled by using the scrambling sequence, an operation or processing other than addition and multiplication may be further performed on the scrambling sequence and the to-be-scrambled sequence, to obtain the scrambled output sequence. This is not limited in this application.

With development of wireless communications technologies, a service volume in a communications system continuously increases. In scrambling-based data transmission, to support a higher service volume, the embodiments of this application provide the corresponding technical solutions, to improve a system transmission rate, thereby supporting a higher service volume.

The technical solutions provided in the embodiments of this application may be applied to wireless communication between various communications devices. For example, the technical solutions provided in the embodiments of this application may be applied to one or more of uplink transmission between a base station and UE, downlink transmission between a base station and UE, uplink transmission between a macro base station and a micro base station, downlink transmission between a macro base station and a micro base station, device-to-device (D2D) communication, and vehicle to vehicle (V2V) communication. In the technical solutions provided in the embodiments of this application, the uplink transmission or the downlink transmission between the base station and the UE is used as an example to describe the technical solutions provided in the embodiments of this application.

Figure 3:
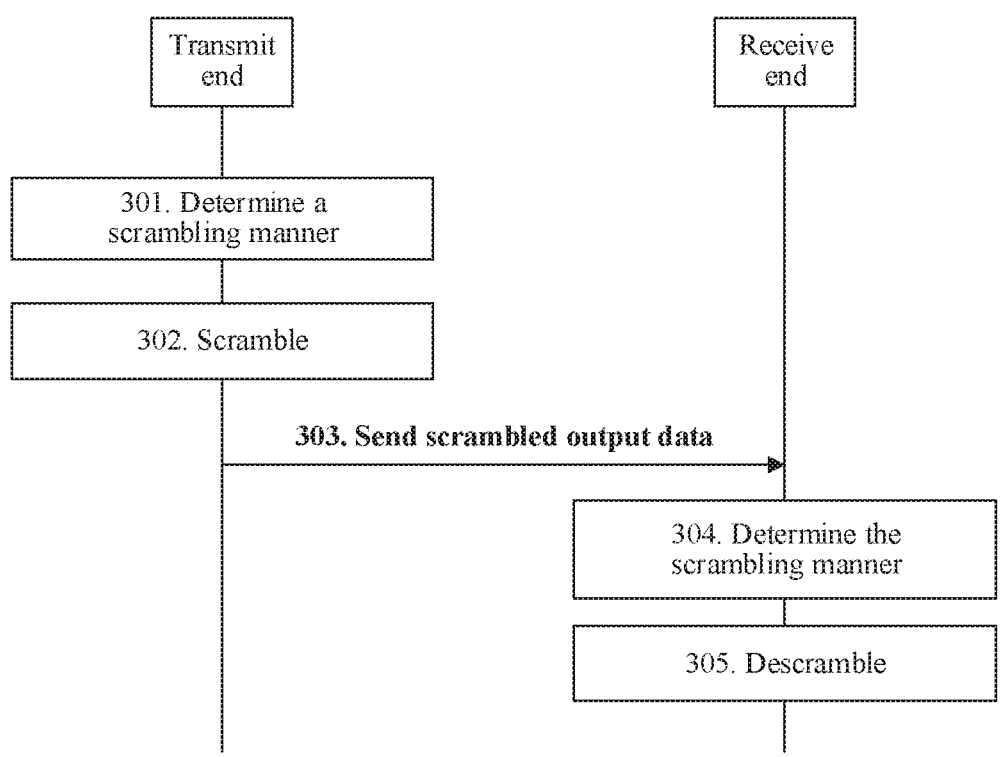
FIG. 3 is a flowchart of scrambling-based data transmission according to an embodiment of this application.

FIG. 3 shows a scrambling-based data transmission method according to an embodiment of this application.

301. A transmit end determines a scrambling manner based on a sending waveform.

In the technical solution provided in the embodiment of this application, the transmit end may send to-be-sent data by using the waveform. The waveform used by the transmit end may also be referred to as a sending waveform, a transmission waveform, a waveform, or another name. This is not limited in this application. For example, the sending waveform may be a discrete Fourier transform spreading orthogonal frequency division multiplexing (DFT-s-OFDM) waveform or a cyclic prefix orthogonal frequency division multiplexing (CP-OFDM) waveform. In the embodiment of this application, the DFT-s-OFDM waveform may also be referred to as DFT-s-OFDM for short, and the CP-OFDM waveform may also be referred to as CP-OFDM for short.

302. The transmit end scrambles to-be-scrambled data based on the scrambling manner, to obtain scrambled output data.

303. The transmit end sends the scrambled output data to a receive end.

304. The receive end receives the scrambled data, and determines the scrambling manner based on the transmission waveform.

In the embodiment of this application, the transmit end sends the scrambled output data obtained by the transmit end to the receive end. The scrambled output data may also be referred to as scrambled data or another name at the receive end. This is not limited in this application.

In the embodiment of this application, when the transmit end sends the to-be-sent data to the receive end by using the sending waveform, the receive end may receive the data by using the transmission waveform. The transmission waveform is the same as the sending waveform. The transmission waveform may also be referred to as a receiving waveform or another name at the receive end. This is not limited in this application. For example, the transmission waveform in 304 is the same as the sending waveform in 301.

Optionally, the method in which the receive end determines the scrambling manner based on the transmission waveform in 304 may be the same as the method in which the transmit end determines the scrambling manner based on the sending waveform in 301.

305. The receive end descrambles the received scrambled data based on the scrambling manner.

According to the scrambling-based data transmission method provided in this embodiment of this application, the scrambling manner may be determined based on the sending waveform, so that the to-be-sent data obtained based on the scrambling manner may have a low peak-to-average power ratio (PAPR), or a PAPR of the to-be-sent data obtained based on the scrambling manner may not be increased, thereby improving data transmission efficiency.

In the method provided in the embodiment of this application, the scrambling manner may include at least one of frequency domain scrambling, time domain scrambling, and time-frequency domain scrambling. The to-be-scrambled data may be a bit or a complex number symbol. The to-be-scrambled data may also be referred to as input data or another name. This is not limited in this application. For ease of description, in the embodiment of this application, an example in which the to-be-scrambled data is a complex number symbol is used to describe the technical solution provided in this embodiment of this application.

In the method provided in this embodiment of this application, when the scrambling manner is determined based on the sending waveform, if the sending waveform is the DFT-s-OFDM waveform, the scrambling manner may be the time domain scrambling. In the method provided in this embodiment of this application, when the scrambling manner is determined based on the sending waveform, if the sending waveform is the CP-OFDM waveform, the scrambling manner may be the time domain scrambling, the frequency domain scrambling, or the time-frequency domain scrambling.

Figure 4A:
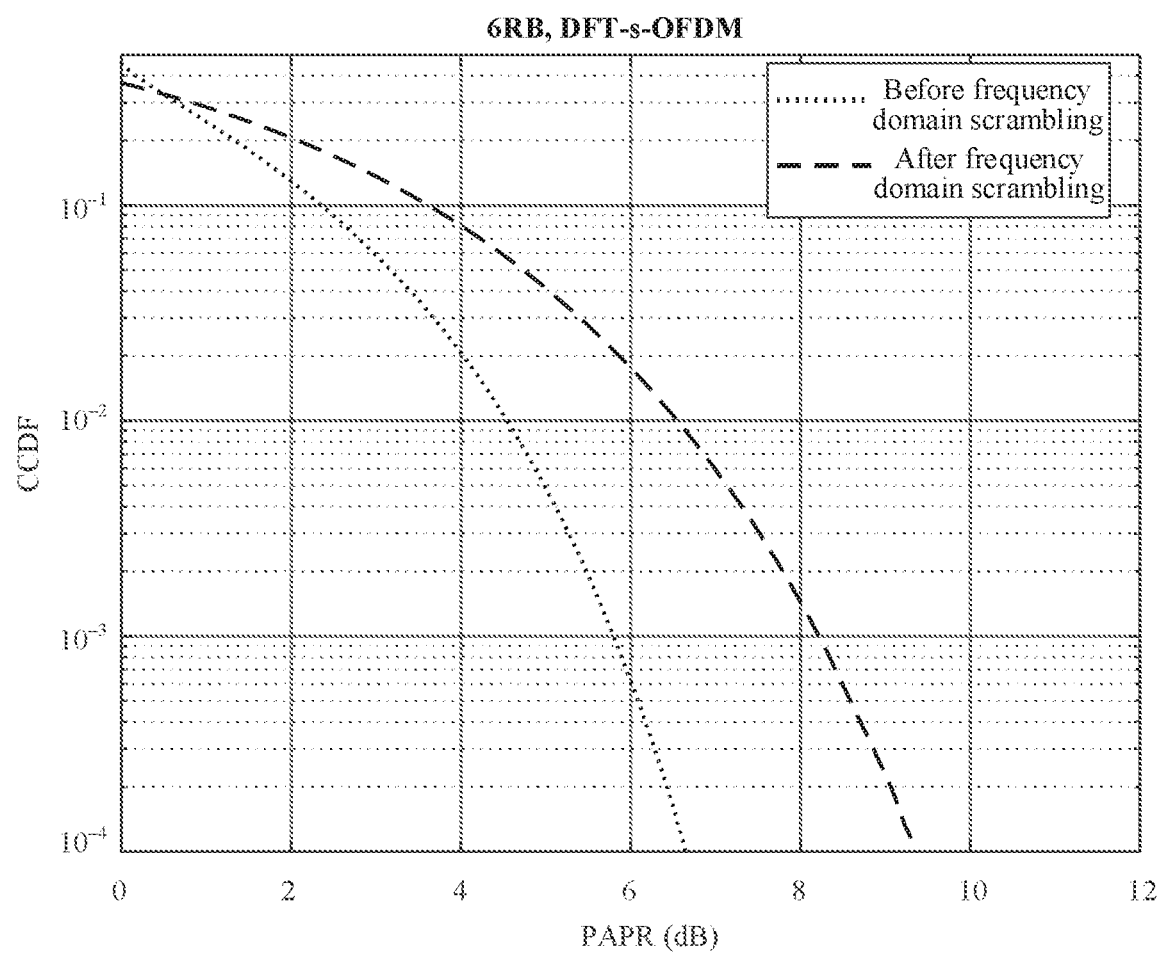
FIG. 4(a) and FIG. 4(b) are a simulation result diagram according to an embodiment of this application.

For example, if the to-be-scrambled data is a symbol on which QPSK modulation is performed, and resources used for data transmission in frequency domain are six resource blocks (RB), FIG. 4(a) shows, when the sending waveform is the DFT-s-OFDM waveform and the scrambling manner is the frequency domain scrambling, complementary cumulative distribution functions (CCDF) of PAPRs of the to-be-sent data before and after scrambling. A CCDF of a PAPR may represent a probability that the PAPR exceeds a particular threshold. As shown in FIG. 4(a), the frequency domain scrambling increases the PAPR of the to-be-sent data.

Figure 4B:
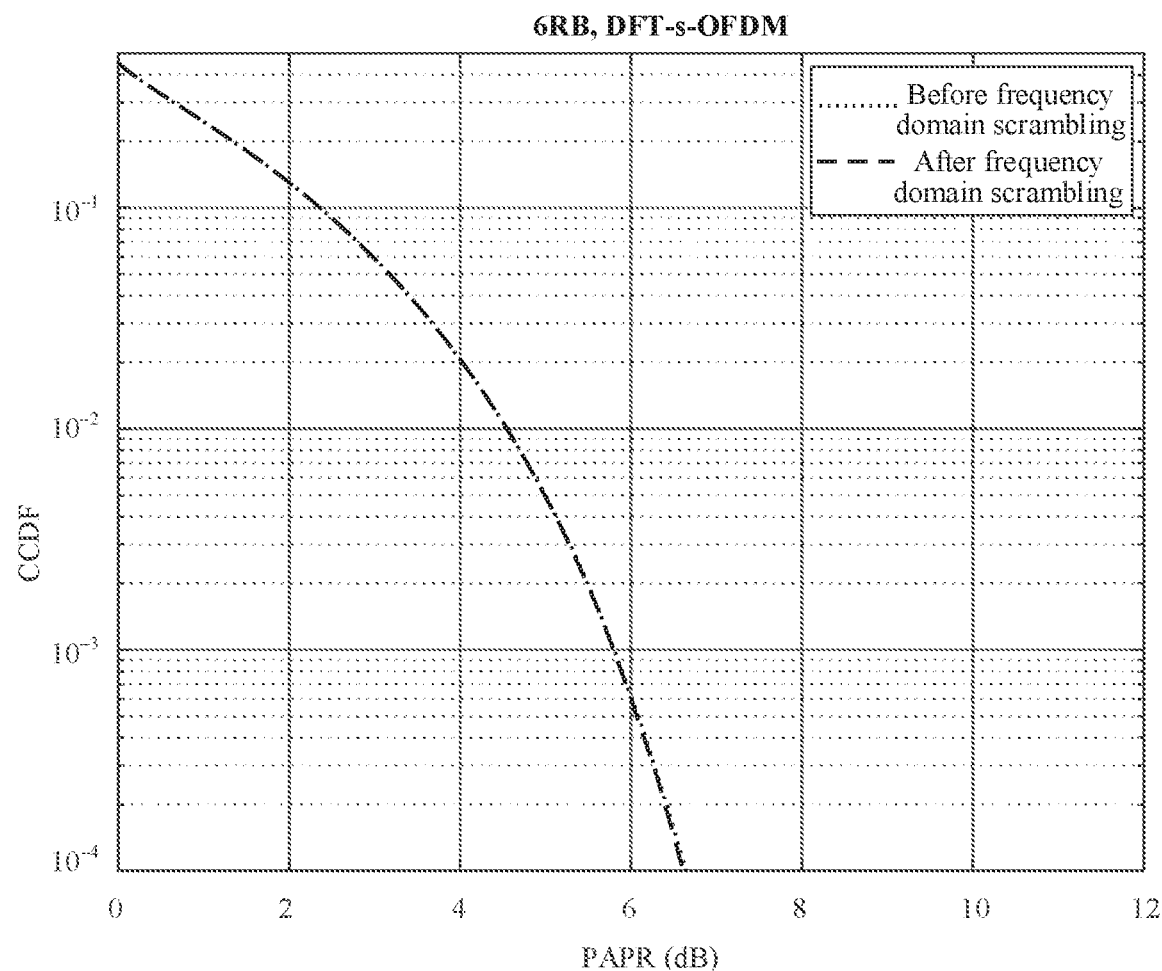

For another example, if the to-be-scrambled data is a symbol on which QPSK modulation is performed, resources used for data transmission in frequency domain are six RBs, FIG. 4(b) shows, when the sending waveform is the DFT-s-OFDM waveform and the scrambling manner is the time domain scrambling, CCDFs of PAPRs of the to-be-sent data before and after scrambling. As shown in FIG. 4(b), the time domain scrambling does not increase the PAPR of the to-be-sent data. Therefore, if the sending waveform is the DFT-s-OFDM waveform, the time domain scrambling may be used.

It should be noted that the results shown in FIG. 4(a) and FIG. 4(b) are simulation results obtained in a specific scenario. When the scenario changes, a result different from the results shown in FIG. 4(a) and FIG. 4(b) may be further obtained. Therefore, another specific design in which the scrambling manner is determined based on the sending waveform may be further obtained, and the another specific design also falls within the protection scope of this application.

In a system that supports NOMA, the transmit end may preprocess to-be-preprocessed input data to obtain preprocessed output data, and send the preprocessed output data to the receive end. Communication between the base station and the UE is used as an example. If the transmit end is the UE, different UEs may map respective preprocessed output data to a same resource element for sending, the preprocessed output data of the different UEs may be non-orthogonal, and the base station may receive superposition of a plurality of pieces of non-orthogonal preprocessed output data on the resource element. If the transmit end is the base station, the base station may map preprocessed output data of different UEs to a same resource element for sending, and the preprocessed output data of the different UEs is non-orthogonal. Before performing resource mapping (mapping the to-be-sent data to the resource element), the transmit end may further perform other processing on the preprocessed output data. This is not limited in this application. For example, the other processing may include one or more of the following: layer mapping and precoding.

In the embodiment of this application, when preprocessing the to-be-preprocessed input data, the transmit end may preprocess the to-be-preprocessed input data by using a preprocessing codebook, to obtain the preprocessed output data, and send the preprocessed output data to the receive end. A type of the preprocessing codebook includes an extended sequence, an extended matrix, or an extended sequence set. The to-be-preprocessed input data may be various types of data, such as a bit or a complex number symbol. If the to-be-preprocessed input data is the complex number symbol, the to-be-preprocessed input data may be a modulation symbol or a complex number symbol of another type. This is not limited in this application. If the to-be-preprocessed input data is the complex number symbol, the corresponding preprocessed output data may also be referred to as a preprocessed output symbol or another name. This is not limited in this application.

In the embodiment of this application, if the preprocessing codebook is the extended sequence, the preprocessing means that the extended sequence is multiplied by the to-be-preprocessed input data, or it may be described as that the preprocessed output data is equal to the extended sequence multiplied by the to-be-preprocessed input data. The preprocessed output data obtained after one-time preprocessing may also be referred to as a preprocessed unit or another name. This is not limited in this application.

Figure 5:
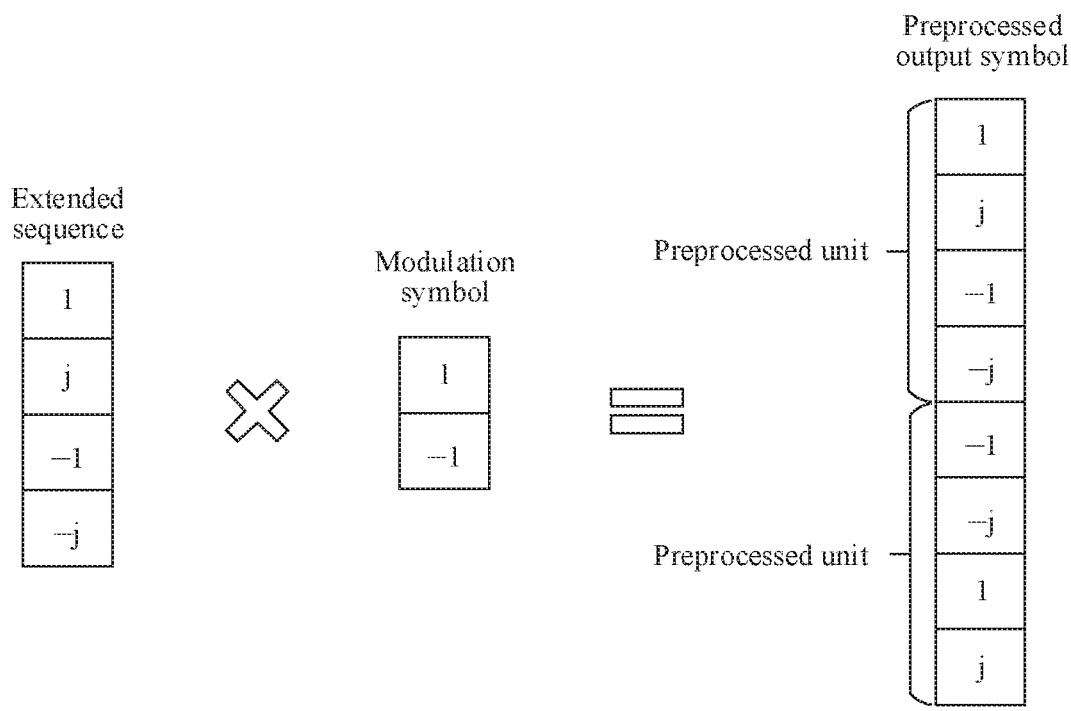
FIG. 5 is a schematic diagram of preprocessing to-be-preprocessed input data according to an embodiment of this application.

FIG. 5 is a schematic diagram of preprocessing to-be-preprocessed input data based on an extended sequence. In FIG. 5, the to-be-preprocessed input data is two modulation symbols, the two modulation symbols are respectively 1 and $-1$, and the extended sequence is $[1, j, -1, j]^T$. A modulation symbol 1 is preprocessed to obtain preprocessed output data $[1, j, -1, -j]^T$. A modulation symbol $-1$ is preprocessed to obtain preprocessed output data $[-1, -j, 1, j]^T$.

In the embodiment of this application, if a preprocessing codebook is an extended matrix with N1 rows and N2 columns, the preprocessing means that the extended matrix is multiplied by the to-be-preprocessed input data, and the to-be-preprocessed input data includes N2 pieces of data.

Figure 6:
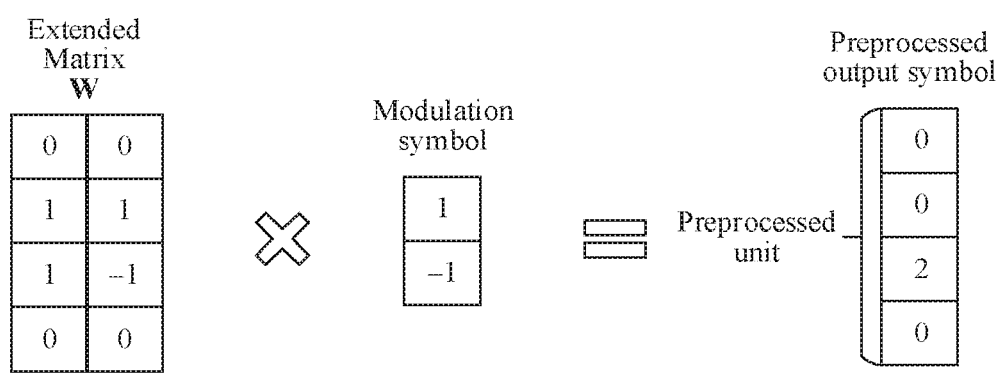
FIG. 6 is a schematic diagram of preprocessing to-be-preprocessed input data according to an embodiment of this application.

FIG. 6 is a schematic diagram of preprocessing to-be-preprocessed input data based on an extended matrix. As shown in FIG. 6, the extended matrix is W with four rows and two columns, the to-be-preprocessed input data is a modulation symbol sequence [1, −1], and the matrix W is multiplied by the to-be-preprocessed input data, to obtain preprocessing output data [0, 0, 2, 0].

In the embodiment of this application, if a preprocessing codebook is an extended sequence set including S extended sequences, the preprocessing means that the to-be-preprocessed input data is mapped to one of the S extended sequences. When the preprocessing means that the to-be-preprocessed input data is mapped to one of the S extended sequences, the preprocessed output data may be determined based on the to-be-preprocessed input data and a mapping relationship between the to-be-preprocessed input data and an extended sequence in the S extended sequences, where S is a positive integer.

Figure 7:
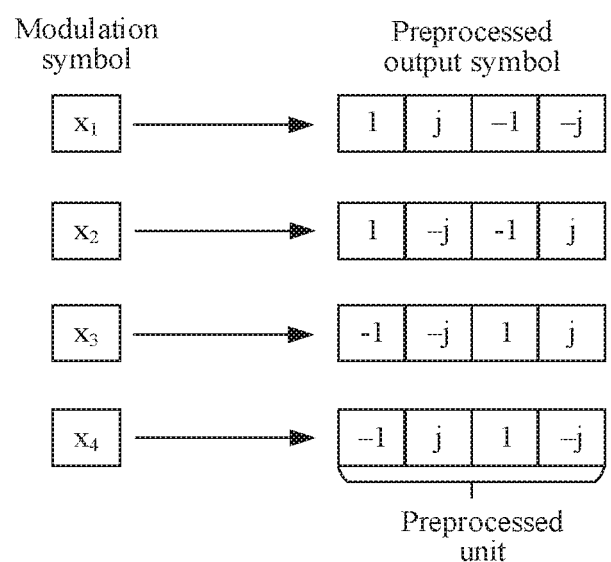
FIG. 7 is a schematic diagram of preprocessing to-be-preprocessed input data according to an embodiment of this application.

An example in which to-be-preprocessed input data is a modulation symbol is used. FIG. 7 is an example diagram of preprocessing the to-be-preprocessed input data based on an extended sequence set. As shown in FIG. 7, the extended sequence set includes extended sequences [1, j, −1, −j], [1, −j, −1, j], [−1, −j, 1, j], and [−1, j, 1, −j]. A possible value of the to-be-preprocessed input data is x1, x2, x3, or x4. Correspondences between the modulation symbols and the extended sequences in the extended sequence set are shown in FIG. 7. An extended sequence corresponding to the modulation symbol x1 is [1, j, −1, −j], an extended sequence corresponding to the modulation symbol x2 is [1, −j, −1, j], an extended sequence corresponding to the modulation symbol x3 is [−1, −j, 1, j], and an extended sequence corresponding to the modulation symbol x4 is [−1, j, 1, −j]. If the to-be-preprocessed input data is x1, a preprocessed output symbol is determined as [1, j, −1, −j] based on x1 and the correspondences between the modulation symbols and the extended sequences in the extended sequence set.

In the method provided in this embodiment of this application, that the scrambling manner is determined based on the sending waveform may include: determining the scrambling manner based on the sending waveform and the type of the preprocessing codebook. In the method, the transmit end may first perform preprocessing and then perform scrambling, or may first perform scrambling and then perform preprocessing, or may simultaneously perform scrambling and preprocessing. This is not limited in this application. For example, if the sending waveform is the CP-OFDM waveform and the type of the preprocessing codebook is the extended sequence, the scrambling manner is the frequency domain scrambling. For another example, if the sending waveform is the DFT-s-OFDM waveform and the type of the preprocessing codebook is the extended sequence, the scrambling manner is the time domain scrambling. Based on the method, the to-be-sent data obtained based on the scrambling manner and the preprocessing codebook may have the low peak-to-average power ratio PAPR, or the PAPR of the to-be-sent data obtained based on the scrambling manner and the preprocessing codebook may not be increased, thereby improving data transmission efficiency.

Figure 8A:
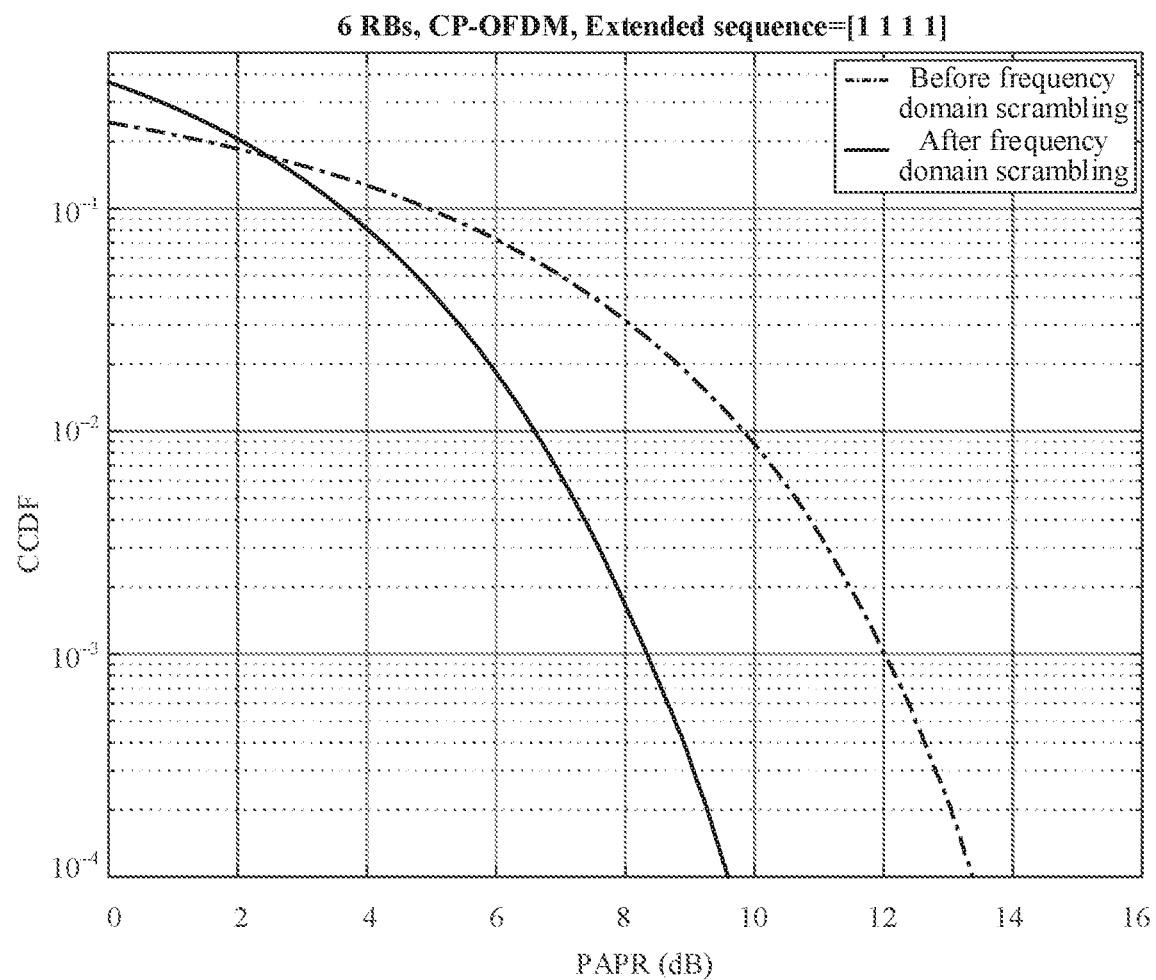
FIG. 8(a) and FIG. 8(b) are a simulation result diagram according to an embodiment of this application.
Figure 8B:
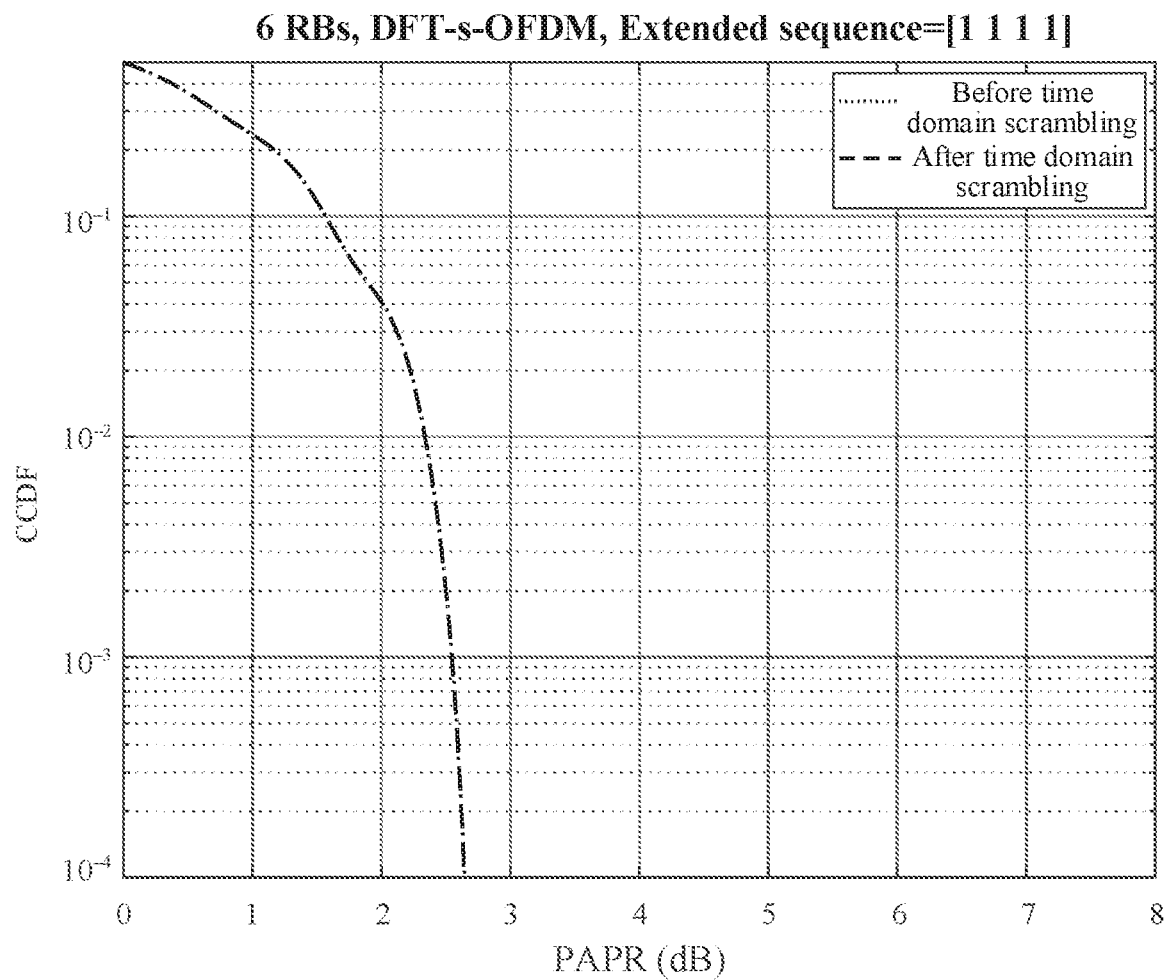

For example, if the to-be-scrambled data is a preprocessed output symbol obtained by preprocessing a QPSK modulation symbol, the preprocessing codebook is an extended sequence [1, 1, 1, 1], and resources used for data transmission in frequency domain are six RBs, FIG. 8(*a*) shows, when the sending waveform is the CP-OFDM waveform and the scrambling manner is the frequency domain scrambling, CCDFs of PAPRs of the to-be-sent data before and after scrambling. As shown in FIG. 8(*a*), the frequency domain scrambling reduces the PAPR of the to-be-sent data.

For another example, if the to-be-scrambled data is a preprocessed output symbol obtained by preprocessing a QPSK modulation symbol, the preprocessing codebook is an extended sequence [1, 1, 1, 1], and resources used for data transmission in frequency domain are six RBs. FIG. 8(*b*) shows, when the sending waveform is the DFT-s-OFDM waveform and the scrambling manner is the time domain scrambling, CCDFs of PAPRs of the to-be-sent data before and after scrambling. As shown in FIG. 8(*b*), the time domain scrambling does not increase the PAPR of the to-be-sent data.

It should be noted that the results shown in FIG. 8(*a*) and FIG. 8(*b*) are simulation results obtained in a specific scenario. When the scenario changes, a result different from the results shown in FIG. 8(*a*) and FIG. 8(*b*) may be further obtained. Therefore, another specific design in which the scrambling manner is determined based on the sending waveform and the type of the preprocessing codebook may be further obtained, and the another specific design also falls within the protection scope of this application.

Figure 9:
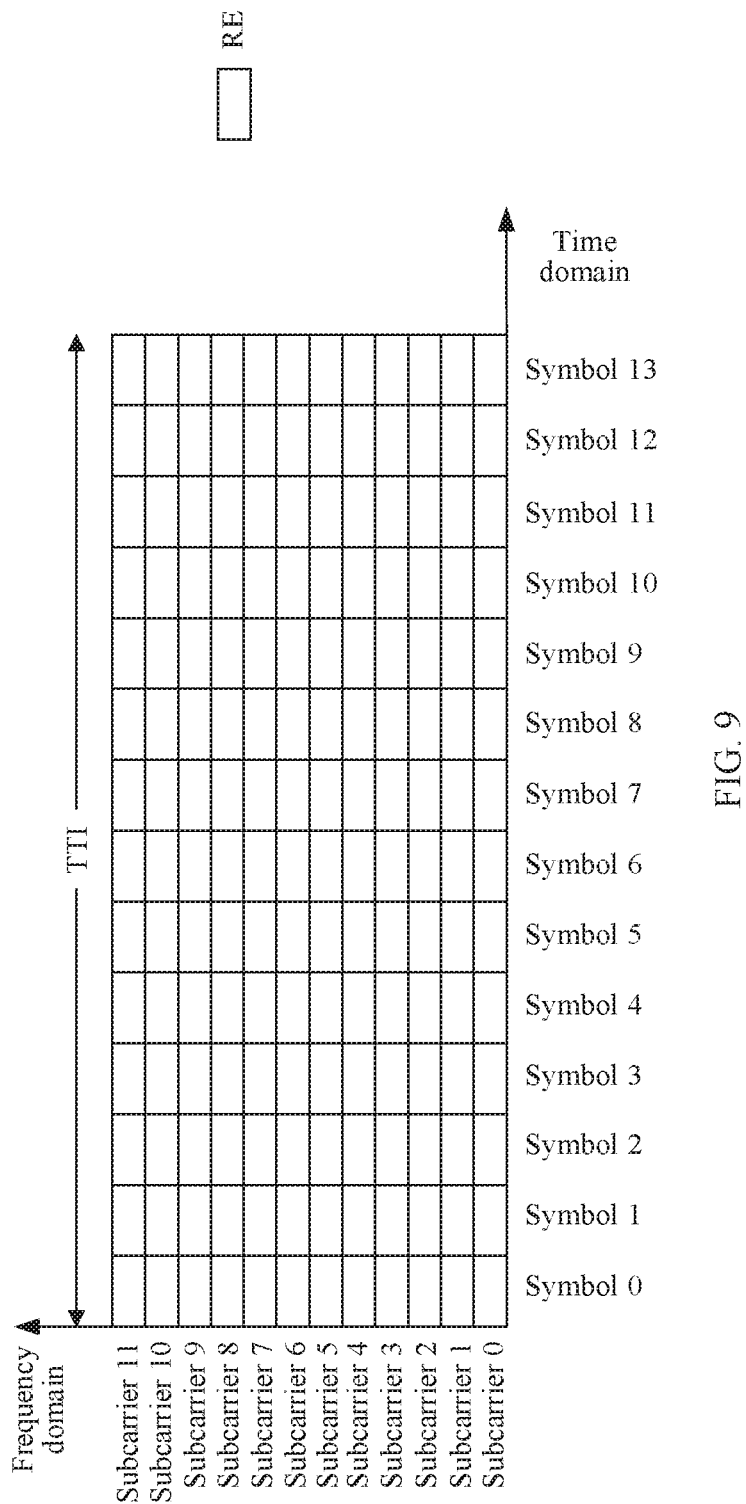
FIG. 9 is an example diagram of a time-frequency resource according to an embodiment of this application.

In an orthogonal frequency division multiplexing (OFDM)-based wireless communications system, a transmit end and a receive end may perform data transmission on an air interface resource. The air interface resource may include a time domain resource, a frequency domain resource, a time-frequency resource, or a space resource, and the time-frequency resource may also be described as the time domain resource and the frequency domain resource. If the air interface resource is the time-frequency resource, the transmit end and the receive end may perform data transmission on a resource element (RE). FIG. 9 is an example diagram of a time-frequency resource. As shown in FIG. 9, a minimum unit used for data transmission in the time-frequency resource may be an RE, the time-frequency resource may include a positive integer quantity of REs, and one RE corresponds to one symbol in time domain and corresponds to one subcarrier in frequency domain. In the example shown in FIG. 9, when performing data transmission, the transmit end and the receive end may perform, in time domain, data transmission based on a transmission time interval (TTI). In the embodiment of this application, the TTI may include a positive integer quantity of time units. A time unit includes a symbol, a slot, a mini-slot, a subframe, a frame, or another time unit common in the art. This is not limited in this application.

In the method provided in this embodiment of this application, that the transmit end scrambles the to-be-scrambled data based on the scrambling manner may include that the transmit end scrambles the to-be-scrambled data based on the scrambling manner by using a scrambling sequence. Further, the scrambling sequence may be further used by the receive end to perform descrambling.

Figure 10:
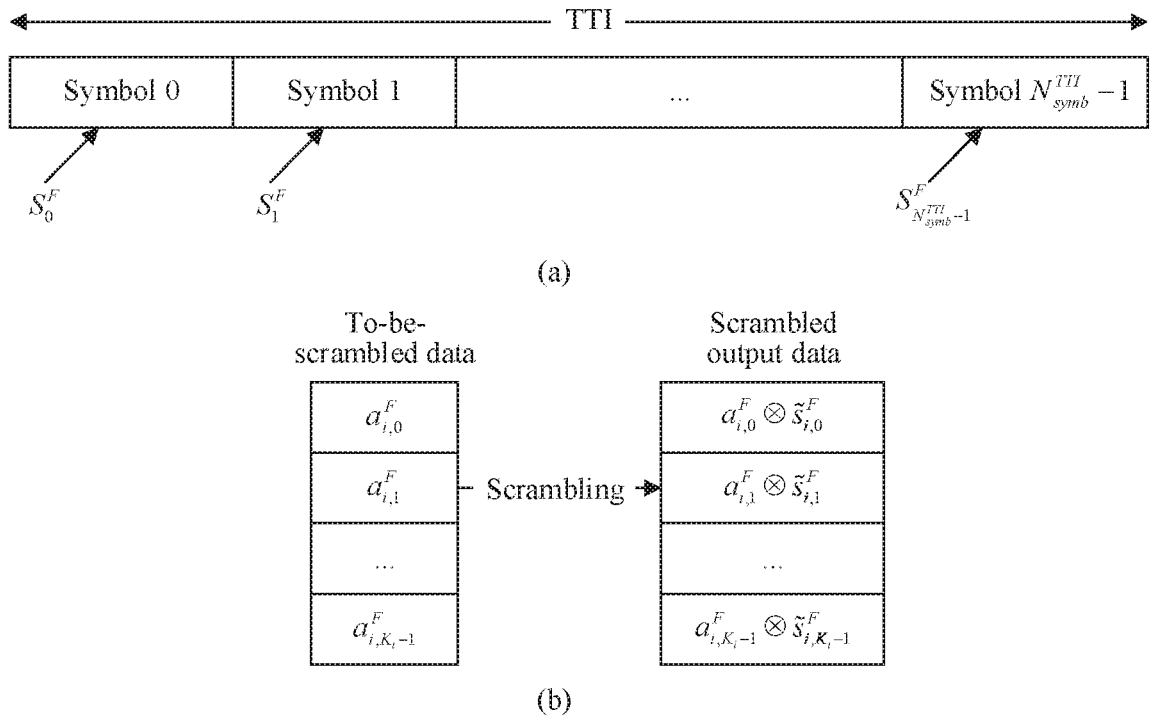
FIG. 10 is a schematic diagram of frequency domain scrambling according to an embodiment of this application.

FIG. 10 is an example diagram of scrambling to-be-scrambled data by using a scrambling sequence when a scrambling manner is frequency domain scrambling, where a TTI includes $N_{symb}^{TTI}$ OFDM symbols, and the to-be-scrambled data is a complex number symbol.

As shown in FIG. 10(*a*), the scrambling sequence includes $N_{symb}^{TTI}$ subsequences. One subsequence corresponds to one symbol in the TTI, and is used to scramble to-be-scrambled data transmitted on the symbol. An $i^{th}$ sequence in the $N_{symb}^{TTI}$ subsequences is $S_i^F$, where i=0, . . . , $N_{symb}^{TTI}$−1. Lengths of any two of the $N_{symb}^{TTI}$ subsequences may be the same or may be different. This is not limited in this application.

FIG. 10(*b*) is an example diagram of scrambling performed, based on a subsequence $S_i^F$, on to-be-scrambled data transmitted on an $i^{th}$ symbol in the TTI, where i=0, . . . , $N_{symb}^{TTI}$−1. As shown in FIG. 10(*b*), $K_i$ to-be-scrambled data transmitted by a transmit end on the $i^{th}$ a symbol may be represented as $a_{i,j}^F$, j=0, . . . , $K_i$−1, where $K_i$ is a positive integer, and one of the $K_i$ to-be-scrambled data is transmitted on an RE of the $i^{th}$ symbol. Scrambled output data corresponding to $a_{i,j}^F$ may be represented as $a_{i,j}^F \otimes \tilde{s}_{i,j}^F$, that is, $a_{i,j}^F$ multiplied by $\tilde{s}_{i,j}^F$, where $\tilde{s}_{i,j}^F$ is a $j^{th}$ element in the subsequence $S_i^F$, and j=0, . . . , $K_i$−1.

Figure 11:
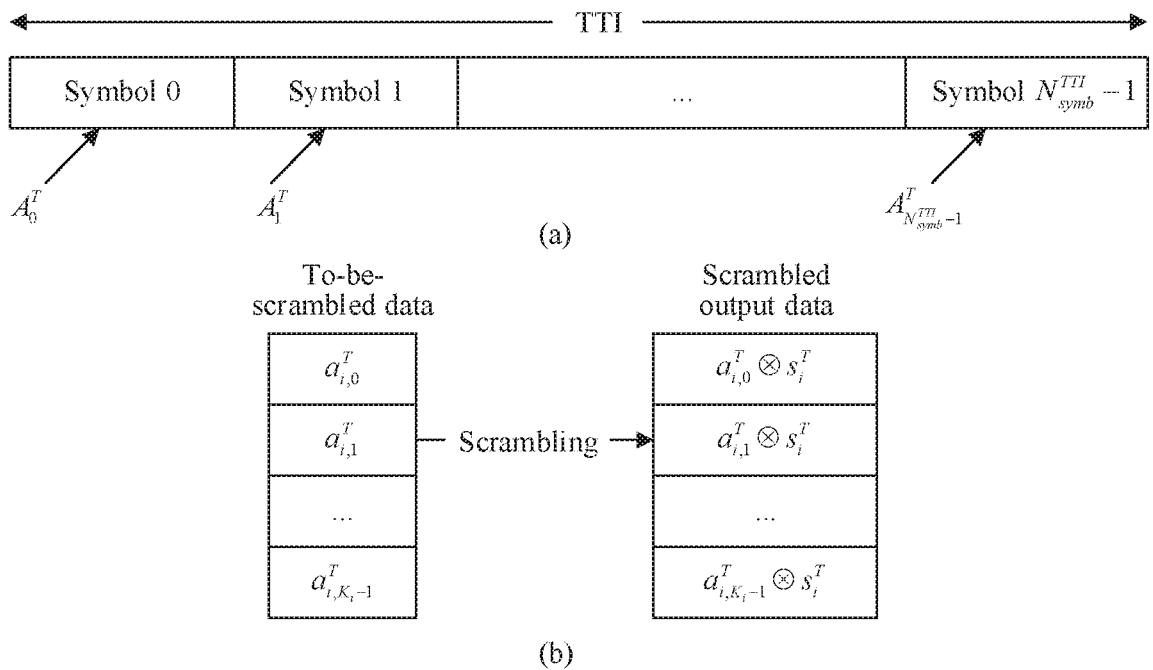
FIG. 11 is a schematic diagram of time domain scrambling according to an embodiment of this application.

FIG. 11 is an example diagram of scrambling to-be-scrambled data by using a scrambling sequence when a scrambling manner is time domain scrambling. A TTI includes $N_{symb}^{TTI}$ symbols, the to-be-scrambled data is a complex-number symbol, a length of the scrambling sequence is $N_{symb}^{TTI}$, and $s_i^T$ is an $i^{th}$ element in the scrambling sequence, where i=0, . . . , $N_{symb}^{TTI}$−1.

As shown in FIG. 11(*a*), the to-be-scrambled data includes $N_{symb}^{TTI}$ subsequences, an $i^{th}$ sequence in the subsequences $N_{symb}^{TTI}$ is $A_i^T$, where i=0, . . . , $N_{symb}^{TTI}$−1. Lengths of any two of the $N_{symb}^{TTI}$ subsequences may be the same or may be different. This is not limited in this application. Data in $A_i^T$ is transmitted on REs corresponding to an $i^{th}$ OFDM symbol in the TTI. To be specific, one piece of data in $A_i^T$ is transmitted on an RE corresponding to the $i^{th}$ OFDM symbol.

As shown in FIG. 11(*b*), data in $A_i^T$ is scrambled based on the $i^{th}$ element $s_i^T$ in the scrambling sequence, to obtain scrambled output data corresponding to $A_i^T$. Scrambled output data corresponding to $a_{i,j}^T$ may be represented as $a_{i,j}^T \otimes s_i^T$, that is, $a_{i,j}^T$ multiplied by $s_i^T$, where $a_{i,j}^T$ is $j^{th}$ data in $A_i^T$, and $j=0, \ldots, K_i-1$.

When performing the time-frequency domain scrambling, the transmit end may scramble the to-be-scrambled data in a manner of first performing the time domain scrambling and then performing the frequency domain scrambling. Alternatively, the transmit end may scramble the to-be-scrambled data in a manner of first performing the frequency domain scrambling and then performing the time domain scrambling, to obtain scrambled data. Alternatively, the transmit end may scramble the to-be-scrambled data in a manner of simultaneously performing the frequency domain scrambling and the time domain scrambling. This is not limited in this application. A scrambling method for performing the time domain scrambling is the same as corresponding descriptions in the method in FIG. 11, and a scrambling method for performing the frequency domain scrambling is the same as corresponding descriptions in the method in FIG. 10.

Figure 12:
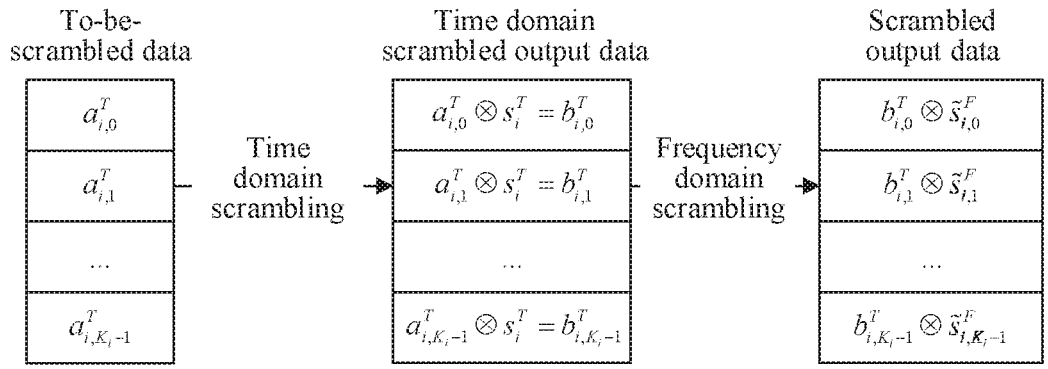
FIG. 12 is a schematic diagram of time-frequency domain scrambling according to an embodiment of this application.

FIG. 12 is an example diagram of scrambling to-be-scrambled data by using a scrambling sequence when a scrambling manner is time-frequency domain scrambling. When performing the time-frequency domain scrambling, time domain scrambling is first performed, and then frequency domain scrambling is performed. A TTI includes $N_{symb}^{TTI}$ symbols, the to-be-scrambled data is a complex-number symbol, and the scrambling sequence includes a time domain scrambling sequence and a frequency domain scrambling sequence.

A length of the time domain scrambling sequence is $N_{symb}^{TTI}$, and an $i^{th}$ element in the time domain scrambling sequence is $s_i^T$, where $i=0, 1, \ldots, N_{symb}^{TTI}-1$. The time domain scrambling sequence in FIG. 12 and the scrambling sequence in FIG. 11 may be the same or may be different. This is not limited in this application.

The frequency domain scrambling sequence includes $N_{symb}^{TTI}$ subsequences, an $i^{th}$ sequence in the $N_{symb}^{TTI}$ subsequences is $S_i^F$, where $i=0, \ldots, N_{symb}^{TTI}-1$. Lengths of any two of the $N_{symb}^{TTI}$ subsequences may be the same or may be different. This is not limited in this application. The frequency domain scrambling sequence in FIG. 12 and the scrambling sequence in FIG. 10 may be the same or may be different. This is not limited in this application.

The to-be-scrambled data includes $N_{symb}^{TTI}$ subsequences, and an $i^{th}$ sequence in the $N_{symb}^{TTI}$ subsequences is $A_i^T$, where $i=0, \ldots, N_{symb}^{TTI}-1$. Lengths of any two of the $N_{symb}^{TTI}$ subsequences may be the same or may be different. This is not limited in this application.

As shown in FIG. 12, the time domain scrambling is performed on the to-be-scrambled data. Data in $A_i^T$ is scrambled based on the $i^{th}$ element $s_i^T$ in the time domain scrambling sequence, to obtain time domain scrambled output data $B_i^T$ corresponding to $A_i^T$. A value of an $i^{th}$ element $b_{i,j}^T$ in $B_i^T$ is equal to $a_{i,j}^T \otimes s_i^T$, where $a_{i,j}^T$ is $j^{th}$ data in $A_i^T$, and $j=0, \ldots, K_i-1$.

As shown in FIG. 12, the frequency domain scrambling is performed on the time domain scrambled output data, to obtain scrambled output data. Scrambled output data corresponding to $b_{i,j}^T$ may be represented as $b_{i,j}^T \otimes \tilde{s}_{i,j}^F$, where $\tilde{s}_{i,j}^F$ is a $j^{th}$ element in the subsequence $S_i^F$, and $j=0, \ldots, K_i-1$.

In the method provided in this embodiment of this application, the scrambling sequence may be determined based on an initial value of a first sequence, and the first sequence is used to determine the scrambling sequence.

For example, in a first scrambling sequence determining method, a length of the scrambling sequence is L, and a value $r(m)$ of an $m^{th}$ element in the scrambling sequence may be determined based on a formula (1), where $m=0, 1, \ldots, L-1$, and L is a positive integer.

$$r(m) = \frac{1}{\sqrt{2}}(1 - 2 \times c(2m)) + j\frac{1}{\sqrt{2}}(1 - 2 \times c(2m+1)), \quad \text{(formula 1)}$$

where the foregoing sequence c is a Gold sequence, a value in the sequence c may also be described as $c(n)$, and $c(n)$ may be equal to a modulo operation on a sum of at least two m-sequences using 2. For example:

$c(n)=(x_2(n+N_C)+x_1(n+N_C)) \bmod 2$ $x_2(n+31)=(x_2(n+3)+x_2(n)) \bmod 2$ $x_1(n+31)=(x_1(n+3)+x_1(n+2)+x_1(n+1)+x_1(n)) \bmod 2$ (formula 2), where $N_C$ is an integer, and for example, $N_C=1600$. An initial value of the first m-sequence $x_1$ may be determined based on an application scenario requirement. For example, UEs in different cells use different initial values, so that interference between the different cells can be reduced. For another example, different UEs in a same cell use different initial values, so that interference between the different UEs in the same cell can be reduced. An initial value of the second m-sequence $x_2$ is $x_2(0)=1$, and $x_2(n)=0$, $n=1, 2, 3, \ldots, 30$. If the initial value of the second m-sequence is pre-configured, and the initial value of the first m-sequence is determined based on the application scenario requirement, the value of the scrambling sequence depends on selection of the initial value of the first m-sequence. That is, the scrambling sequence may be determined based on the initial value of the first m-sequence. The m-sequence may also be referred to as another name. This is not limited in this application.

For another example, in a second scrambling sequence determining method, when a length L of the scrambling sequence is 12, a value $d(m)$ determined based on $\varphi(m)$ of a $u^{th}$ row in Table 1 is an $m^{th}$ element in the scrambling sequence, where $m=0, 1, \ldots, L-1$, $$u = \left(\sum_{n=0}^{7} c(n) \times 2^n\right) \bmod 30,$$

$d(m)=e^{j\varphi(m)\pi/4}$, $0 \leq m < L$, $c(n)$ is the same as $c(n)$ of the formula 2 in the first scrambling sequence determining method, and the value of $c(n)$ may be determined based on the initial value of the first m-sequence. That is, the scrambling sequence may be determined based on the initial value of the first m-sequence.

TABLE 1

| u | $\varphi(0), \ldots, \varphi(11)$ | | | | | | | | | | | |
|---|---|---|---|---|---|---|---|---|---|---|---|---|
| 0 | 1 | −1 | 3 | 1 | 1 | −1 | −1 | −1 | 1 | 3 | −3 | 1 |
| 1 | −1 | −1 | −1 | −1 | 1 | −3 | −1 | 3 | 3 | −1 | −3 | 1 |
| 2 | −3 | 1 | −3 | −3 | −3 | 3 | −3 | −1 | 1 | 1 | 1 | −3 |
| 3 | −3 | 3 | 1 | 3 | −3 | 1 | 1 | 1 | 1 | 3 | −3 | 3 |
| 4 | −3 | 1 | 3 | −1 | −1 | −3 | −3 | −1 | −1 | 3 | 1 | −3 |
| 5 | −1 | 1 | 1 | −1 | 1 | 3 | 3 | −1 | −1 | −3 | 1 | −3 |
| 6 | −3 | −3 | −1 | 3 | 3 | 3 | −3 | 3 | −3 | 1 | −1 | −3 |
| 7 | −3 | 3 | −3 | 3 | 3 | −3 | −1 | −1 | 3 | 3 | 1 | −3 |

TABLE 1-continued

| u | $\varphi(0), \ldots, \varphi(11)$ | | | | | | | | | | | |
|---|---|---|---|---|---|---|---|---|---|---|---|---|
| 8  | −3 | −1 | −3 | −1 | −1 | −3 |  3 |  3 | −1 | −1 |  1 | −3 |
| 9  | −3 |  3 |  3 |  3 | −1 | −3 | −3 | −1 | −3 |  1 |  3 | −3 |
| 10 |  1 |  3 | −3 |  1 |  3 |  3 |  3 |  1 | −1 |  1 | −1 |  3 |
| 11 | −1 | −3 |  3 | −1 | −3 | −3 | −3 | −1 |  1 | −1 |  1 | −3 |
| 12 |  3 |  1 |  3 |  1 |  3 | −3 | −1 |  1 |  3 |  1 | −1 | −3 |
| 13 | −3 | −3 |  3 |  3 |  3 | −3 | −1 |  1 | −3 |  3 |  1 | −3 |
| 14 | −3 | −1 |  1 | −3 |  1 |  3 |  3 |  3 | −1 | −3 |  3 |  3 |
| 15 | −3 | −3 |  3 |  1 | −3 | −3 | −3 | −1 |  3 | −1 |  1 |  3 |
| 16 | −1 |  1 |  3 | −3 |  1 | −1 |  1 | −1 | −1 | −3 |  1 | −1 |
| 17 | −3 | −1 | −1 |  1 |  3 |  1 |  1 | −1 |  1 | −1 | −3 |  1 |
| 18 | −3 | −1 |  3 | −3 | −3 | −1 | −3 |  1 | −1 | −3 |  3 |  3 |
| 19 | −3 | −3 |  3 | −3 | −1 |  3 |  3 |  3 | −1 | −3 |  1 | −3 |
| 20 | −3 |  1 | −1 | −1 |  3 |  3 | −3 | −1 | −1 | −3 | −1 | −3 |
| 21 | −3 |  1 |  3 |  3 | −1 | −1 | −3 |  3 |  3 | −3 |  3 | −3 |
| 22 | −3 | −1 | −1 | −3 | −1 | −3 |  3 |  1 |  3 | −1 |  3 | −3 |
| 23 | −3 | −1 |  3 |  1 | −3 | −1 | −3 |  1 |  3 |  3 |  3 |  1 |
| 24 | −3 |  3 |  3 |  1 | −3 |  3 | −1 |  1 |  3 | −3 |  3 | −3 |
| 25 |  3 | −1 | −3 |  3 | −3 | −1 |  3 |  3 |  3 | −3 | −1 | −3 |
| 26 |  1 | −1 |  3 | −1 | −1 | −1 | −3 | −1 |  1 |  1 |  1 | −3 |
| 27 | −3 |  3 |  1 | −3 |  1 |  3 | −1 | −1 |  1 |  3 |  3 |  3 |
| 28 | −3 |  3 | −3 |  3 | −3 | −3 |  3 | −1 | −1 |  1 |  3 | −3 |
| 29 | −3 |  3 |  1 | −1 |  3 |  3 | −3 |  1 | −1 |  1 | −1 |  1 |

The initial value of the first sequence may be determined in any one of the following first initial value determining manner to a third initial value determining manner.

First Initial Value Determining Manner:

The initial value of the first sequence is determined based on a cell identifier and a first time unit identifier.

In this embodiment of this application, when the base station performs data transmission with the UE, the base station may manage at least one cell, there may be X UEs in one cell, and a UE may perform data transmission with the base station in the cell, where X is an integer greater than or equal to 0. For example, the base station manages three cells: a cell A, a cell B, and a cell C. There are UE 1A and UE 2A in the cell A (which may also be described as that a cell in which the UE 1A and the UE 2A are located is the cell A). There is UE 1B in the cell B (which may also be described as that a cell in which the UE 1B is located is the cell B). There are UE 1C and UE 2C in the cell C (which may also be described as that a cell in which the UE 1C and the UE 2C are located is the cell C). The UE 1A and the UE 2A may perform data transmission with the base station in the cell A, the UE 1B may perform data transmission with the base station in the cell B, and the UE 1C and the UE 2C may perform data transmission with the base station in the cell C.

In the first initial value determining manner, when the base station performs data transmission with the UE in a cell, the initial value of the first sequence is determined based on the cell identifier of the cell and the first time unit identifier. The first time unit identifier is an identifier or an index corresponding to a first time unit used to transmit the scrambled output data. The first time unit may be a time unit of any type described in the embodiments of this application. For ease of description, an example in which the first time unit is a slot is used to describe the first initial value determining manner.

For example, the initial value of the first sequence may be $c_{init}=(n_s+1) \cdot (2N_{ID}^{cell}+1)$, where $N_{ID}^{cell}$ is the cell identifier, and $n_s$ is the index corresponding to the slot used to transmit the scrambled output data.

For example, the initial value of the first sequence may alternatively be $c_{init}=N_{ID}^{cell}+n_s \cdot 2^9$, where $N_{ID}^{cell}$ is the cell identifier, and $n_s$ is the index corresponding to the slot used to transmit the scrambled output data.

Second Initial Value Determining Manner:

The initial value of the first sequence is determined based on a cell identifier, a UE identifier, and a first time unit identifier.

In the second initial value determining manner, when the base station performs data transmission with the UE in a cell, the initial value of the first sequence is determined based on the cell identifier of the cell, the UE identifier of the UE, and the first time unit identifier. The first time unit identifier is an identifier or an index corresponding to a first time unit used to transmit the scrambled output data. The first time unit may be a time unit of any type described in the embodiments of this application. For ease of description, an example in which the first time unit is a slot is used to describe the second initial value determining manner.

For example, the initial value of the first sequence may be $c_{init}=(n_s+1) \cdot (2N_{ID}^{cell}+1) \cdot 2^{16}+n_{RNTI}$, where $N_{ID}^{cell}$ is the cell identifier, $n_s$ is the index corresponding to the slot used to transmit the scrambled output data, and $n_{RNTI}$ is the UE identifier.

For example, the initial value of the first sequence may alternatively be $c_{init}=(n_s \cdot 2^{25}+n_{RNTI} \cdot 2^9+N_{ID}^{cell}) \bmod 2^{31}$, where $N_{ID}^{cell}$ is the cell identifier, $n_s$ is the index corresponding to the slot used to transmit the scrambled output data, and $n_{RNTI}$ is the UE identifier.

Third Initial Value Determining Manner:

In the third initial value determining manner, when the base station performs data transmission with the UE in a cell, the initial value of the first sequence is determined based on a cell identifier, a UE group identifier, and a first time unit identifier. The UE group identifier is used to identify a UE group in which the UE is located. One UE group includes one or more UEs, and one cell may include one or more UE groups. The first time unit identifier is an identifier or an index corresponding to a first time unit used to transmit the scrambled output data. The first time unit may be a time unit of any type described in the embodiments of this application. For ease of description, an example in which the first time unit is a slot is used to describe the second initial value determining manner.

For example, the initial value of the first sequence may be $c_{init}=(n_s+1) \cdot (2N_{ID}^{cell}+1) \cdot 2^{16}+n_{G\text{-}RNTI}$, where $N_{ID}^{cell}$ is the cell identifier, $n_s$ is the index corresponding to the slot used to transmit the scrambled output data, and $n_{G\text{-}RNTI}$ is the UE group identifier.

For example, the initial value of the first sequence may alternatively be $c_{init}=(n_s \cdot 2^{25}+N_{ID}^{cell} \cdot 2^{16}+n_{G\text{-}RNTI}) \bmod 2^{31}$, where $N_{ID}^{cell}$ is the cell identifier, $n_s$ is the index corresponding to the slot used to transmit the scrambled output data, and $n_{G\text{-}RNTI}$ is the UE group identifier.

The method provided in this embodiment of this application may further include: determining, by the transmit end, the sending waveform, where the sending waveform may be used to send the scrambled output data. The transmit end may determine the sending waveform based on at least one of the following first sending waveform determining manner to a third sending waveform determining manner.

First Sending Waveform Determining Manner:

The transmit end may determine the sending waveform in a pre-configured manner. If the technical solution provided in the embodiment of this application is used for communication between the base station and the UE, at least one of an uplink sending waveform and a downlink sending waveform may be pre-configured. The uplink sending waveform is used by the UE to send data to the base station, and the downlink sending waveform is used by the base station to send data to the UE. For example, the uplink sending waveform may be pre-configured as the DFT-s-OFDM waveform. For another example, the downlink sending waveform may be pre-configured as the CP-OFDM waveform.

Second Sending Waveform Determining Manner:

If the transmit end is the base station, and the receive end is the UE, the base station and the UE perform downlink data transmission, and the base station may send data to the UE by using the CP-OFDM waveform or the DFT-s-OFDM waveform.

The base station may determine the sending waveform, and notify the UE of the determined sending waveform.

For example, the base station may determine the sending waveform based on quality of a channel between the base station and the UE. For example, the base station may measure the quality of the channel between the base station and the UE, or the base station may receive the quality, reported by the UE, of the channel between the base station and the UE, and the base station determines the sending waveform based on the quality of the channel. If the quality of the channel is greater than a threshold or is greater than or equal to a threshold, the base station determines that the sending waveform is CP-OFDM. Alternatively, if the quality of the channel is less than or equal to a threshold or is less than a threshold, the base station determines that the sending waveform is DFT-s-OFDM.

The base station may notify the UE of the sending waveform in any one of the following manner 2A to manner 2D.

Manner 2A:

The base station may send signaling to the UE, and send waveform information to the UE by using the signaling. The waveform information is used to indicate the sending waveform. For example, if the waveform information is 0, the sending waveform is the CP-OFDM waveform. If the waveform information is 1, the sending waveform is the DFT-s-OFDM waveform. For another example, if the waveform information is 1, the sending waveform is the CP-OFDM waveform. If the waveform information is 0, the sending waveform is the DFT-s-OFDM waveform.

In the method provided in the embodiment of this application, the signaling may be higher layer signaling or physical layer signaling. The higher layer signaling may be radio resource control (RRC) signaling, a broadcast message, a system message, or a medium access control (MAC) control element (CE). The physical layer signaling may be signaling carried on a physical control channel or signaling carried on a physical data channel. The signaling carried on the physical control channel may be signaling carried on a physical downlink control channel, signaling carried on an enhanced physical downlink control channel (EPDCCH), or signaling carried on a narrowband physical downlink control channel (NPDCCH), or signaling carried on a machine type communication physical downlink control channel (MPDCCH). The signaling carried on the physical downlink control channel may also be referred to as downlink control information (DCI). The signaling carried on the physical control channel may alternatively be signaling carried on a physical sidelink control channel, and the signaling carried on the physical sidelink control channel may also be referred to as sidelink control information (SCI).

Manner 2B:

The base station may send a reference signal to the UE, and the UE receives the reference signal, and determines the sending waveform based on the reference signal (RS).

In the embodiment of this application, the RS is mainly used for channel estimation or channel measurement, and may also be referred to as a pilot or another name. This is not limited in this application. For example, when communicating with the UE, the base station may transmit the reference signal used for channel state estimation or channel measurement. The base station and the UE may perform matched data transmission based on an estimated channel state or a channel measurement quantity, thereby improving a data transmission rate.

For example, when performing downlink data transmission with the UE, the base station sends a channel state information-reference signal (CSI-RS) to the UE. The UE performs channel estimation based on the received CSI-RS, and the UE sends estimated channel state information to the base station. The base station may send matched downlink data to the UE based on a channel state corresponding to the channel state information, thereby improving a downlink data transmission rate. In the embodiment of this application, the CSI-RS is a reference signal sent by a gNB to the UE, is used for downlink channel estimation or downlink channel measurement, and may also be referred to as a downlink reference signal or another name. This is not limited in this application. Further, the reference signal used for the downlink channel estimation may further include at least one of a cell-specific reference signal (CRS) and a downlink demodulation reference signal (DMRS).

For another example, when performing uplink data transmission with the base station, the UE sends a sounding reference signal (SRS) to the base station. The base station performs channel estimation based on the received SRS and determines a transmission parameter based on an estimated channel state, and the base station may send the transmission parameter to the UE. The UE receives the transmission parameter sent by the base station, and sends uplink data to the base station based on the transmission parameter. According to this design, the UE may send matched uplink data to the base station based on the channel state, thereby improving uplink data transmission rate. In the embodiment of this application, the SRS is a reference signal sent by the UE to the base station, is used for uplink channel estimation or uplink channel measurement, and may also be referred to as an uplink reference signal or another name. This is not limited in this application. Further, the reference signal used for the uplink channel estimation may further include an uplink DMRS.

When the sending waveform is determined based on the reference signal (RS), for example, the sending waveform may be determined based on an RS pattern configuration.

In the embodiment of this application, in the time-frequency resource used for data transmission between the base station and the UE, the base station may determine, based on the reference signal pattern by using a resource granularity corresponding to the reference signal pattern as a unit, REs used to transmit the reference signal, and send the reference signal to the UE on the REs.

Figure 13:
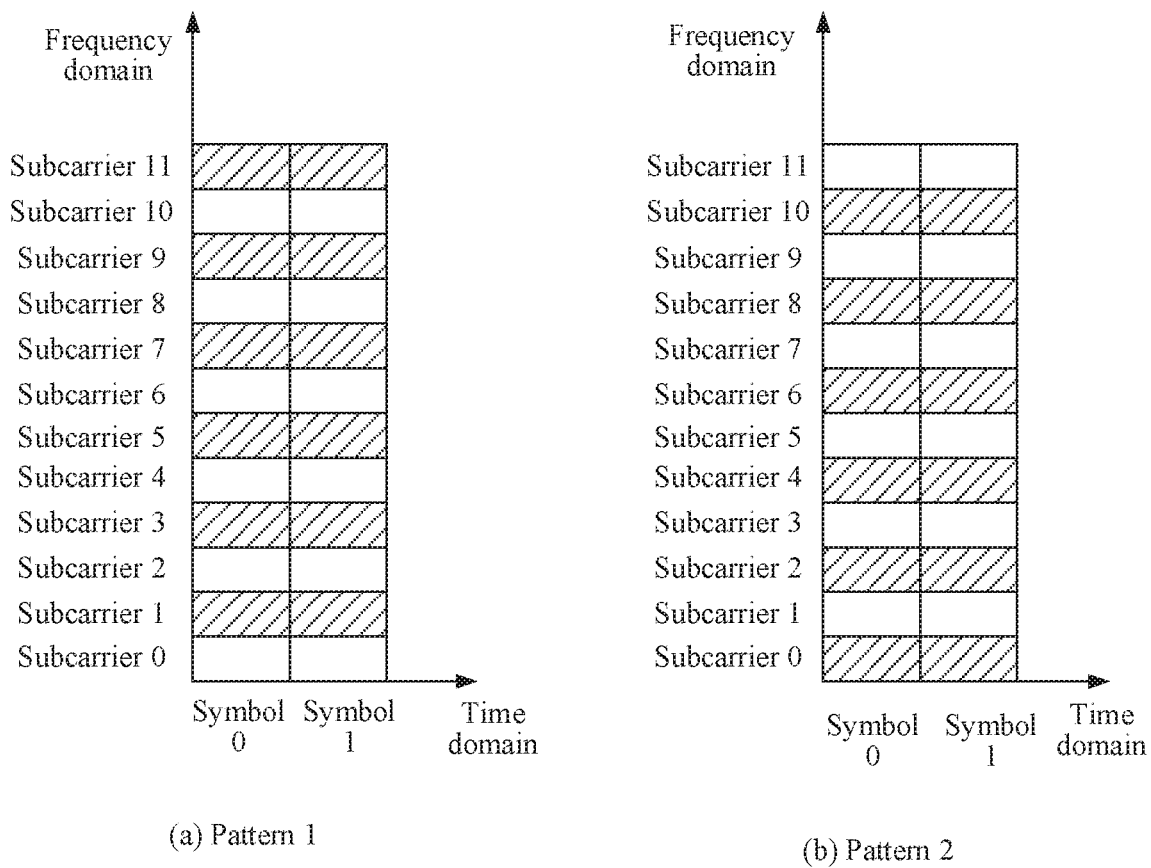
FIG. 13 is an example diagram of a reference signal pattern according to an embodiment of this application.

FIG. 13 is an example diagram of a first reference signal pattern. As shown in FIG. 13, a resource granularity corresponding to the reference signal pattern includes 24 REs, and the 24 REs correspond to 12 subcarriers in frequency domain and two symbols in time domain. In the reference signal pattern shown in FIG. 13, REs used to transmit a reference signal are filled with slashes, and are presented as comb-like distribution with an interval of 2 in frequency domain. Further, there may be one or more configurations of the reference signal pattern presented in comb-like distribution. As shown in FIG. 13(a), in the reference signal pattern, a start frequency domain position of the REs used to transmit the reference signal is a $0^{th}$ subcarrier, and an interval in frequency domain between adjacent REs used to transmit the reference signal is 2. As shown in FIG. 13(b), in the reference signal pattern, a start frequency domain position of the REs used to transmit the reference signal is a first subcarrier, and an interval in frequency domain between adjacent REs used to transmit the reference signal is 2.

Figure 14:
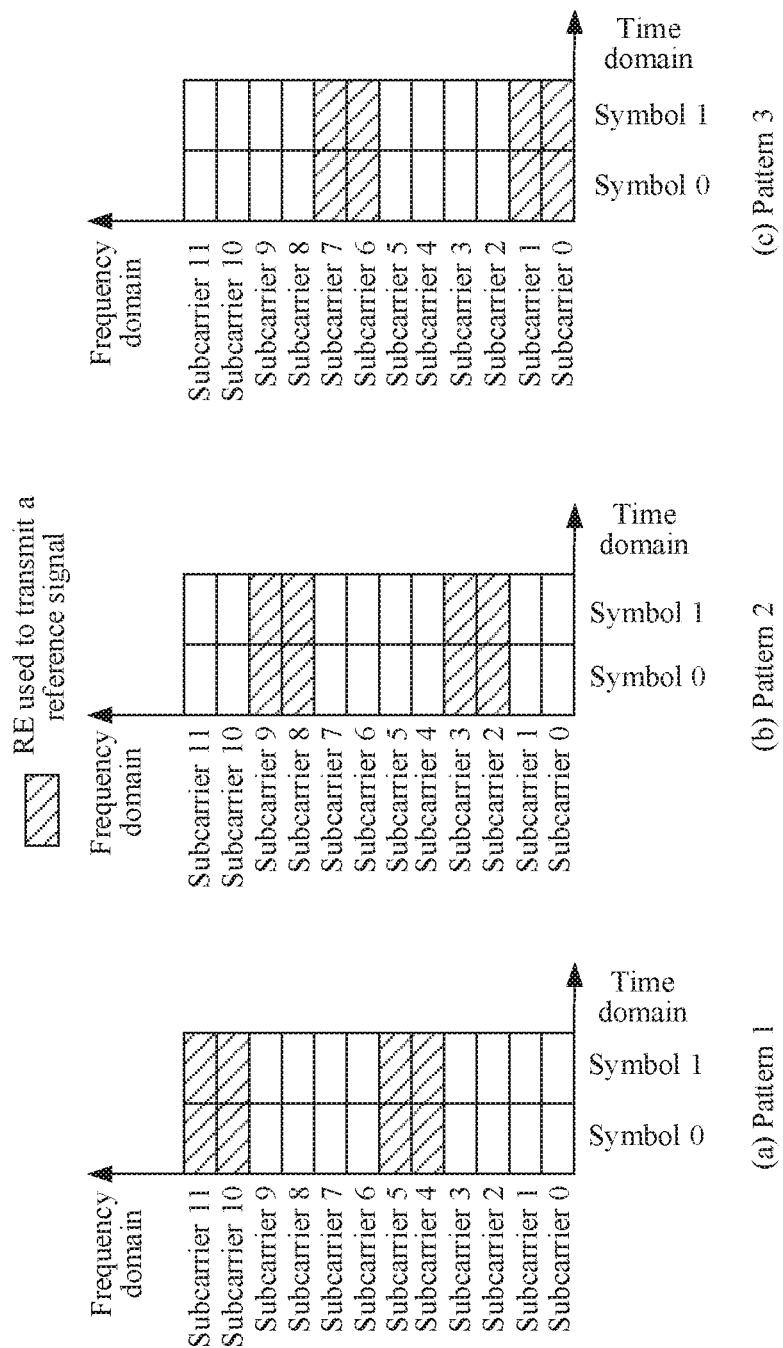
FIG. 14 is an example diagram of a reference signal pattern according to an embodiment of this application.

FIG. 14 is an example diagram of a second reference signal pattern. As shown in FIG. 14, a resource granularity corresponding to the reference signal pattern includes 24 REs, and the 24 REs correspond to 12 subcarriers in frequency domain and two symbols in time domain. In the reference signal pattern shown in FIG. 14, REs used to transmit a reference signal are filled with slashes, and are REs corresponding to two consecutive subcarriers in every six subcarriers in frequency domain. Further, there may be one or more configurations of the second reference signal pattern. As shown in FIG. 14(a), in the reference signal pattern, REs used to transmit the reference signal are REs corresponding to a fourth subcarrier and a fifth subcarrier in every six subcarriers in frequency domain. As shown in FIG. 14(b), in the reference signal pattern, REs used to transmit the reference signal are REs corresponding to a second subcarrier and a third subcarrier in every six subcarriers in frequency domain. As shown in FIG. 14(c), in the reference signal pattern, REs used to transmit the reference signal are REs corresponding to a $0^{th}$ subcarrier and a first subcarrier in every six subcarriers in frequency domain.

In the second sending waveform determining manner, the base station may determine the reference signal pattern based on the sending waveform, determine, based on the reference signal pattern, the REs used to transmit the reference signal, map the reference signal to the REs used to transmit the reference signal, and send the reference signal to the UE on the REs. The UE receives the reference signal, and determines the corresponding sending waveform based on the reference signal pattern.

In the method, the UE may determine a correspondence between the reference signal pattern and the sending waveform based on a pre-configuration. Alternatively, the UE may receive the signaling sent by the base station, and determine a correspondence between the reference signal pattern and the sending waveform by using the signaling. The correspondence between the reference signal pattern and the sending waveform is not limited in the embodiment of this application. For example, when the sending waveform is the CP-OFDM waveform, the reference signal pattern is the first reference signal pattern. When the sending waveform is the DFT-s-OFDM waveform, the reference signal pattern is configured as the second reference signal pattern. For example, the first reference signal pattern may be the reference signal pattern shown in FIG. 13, and the second reference signal pattern may be the reference signal pattern shown in FIG. 14.

When determining the sending waveform based on the reference signal (RS), in a possible implementation, the UE may determine the sending waveform based on a sequence type or a sequence value of the reference signal. According to the method, a PAPR or an interference characteristic of a reference signal sequence can meet a requirement of the sending waveform, thereby improving transmission efficiency.

In the embodiment of this application, the reference signal may be represented as a sequence, and the sequence type of the reference signal may be a PN (pseudo noise) sequence, a ZC (Zadoff-Chu) sequence, or a sequence of any other type. This is not limited in this application.

For example, when the sending waveform is the CP-OFDM waveform, the sequence of the reference signal sent by the base station to the UE is the PN sequence. When the sending waveform is the DFT-s-OFDM waveform, the sequence of the reference signal sent by the base station to the UE is the ZC sequence. The UE receives the reference signal sent by the base station. If the sequence of the reference signal is the PN sequence, the UE determines that the sending waveform is the CP-OFDM waveform. If the sequence of the reference signal is the ZC sequence, the UE determines that the sending waveform is the DFT-s-OFDM waveform.

For another example, when the sending waveform is the CP-OFDM waveform, the sequence of the reference signal sent by the base station to the UE is the ZC sequence. When the sending waveform is the DFT-s-OFDM waveform, the sequence of the reference signal sent by the base station to the UE is the PN sequence. The UE receives the reference signal sent by the base station. If the sequence of the reference signal is the ZC sequence, the UE determines that the sending waveform is the CP-OFDM waveform. If the sequence of the reference signal is the PN sequence, the UE determines that the sending waveform is the DFT-s-OFDM waveform.

When determining the sending waveform based on the reference signal (RS), in another possible implementation, the UE may determine the sending waveform based on a port of the reference signal.

When performing data transmission, the base station and the UE perform data transmission by using a channel. One base station and one UE may perform data transmission by using at least one channel. One channel may correspond to one antenna port, and a symbol transmitted by using one antenna port may be deduced based on another symbol transmitted by using the antenna port. For example, the base station and the UE may transmit the RS and other data by using one antenna port. The RS may be used for channel estimation, and a channel estimation result may be used to demodulate the other data transmitted on the antenna port. To support simultaneous data transmission performed by using a plurality of antenna ports and improve a system capacity, a plurality of RSs may be configured, and each of the plurality of RSs may correspond to one antenna port.

Figure 15A:
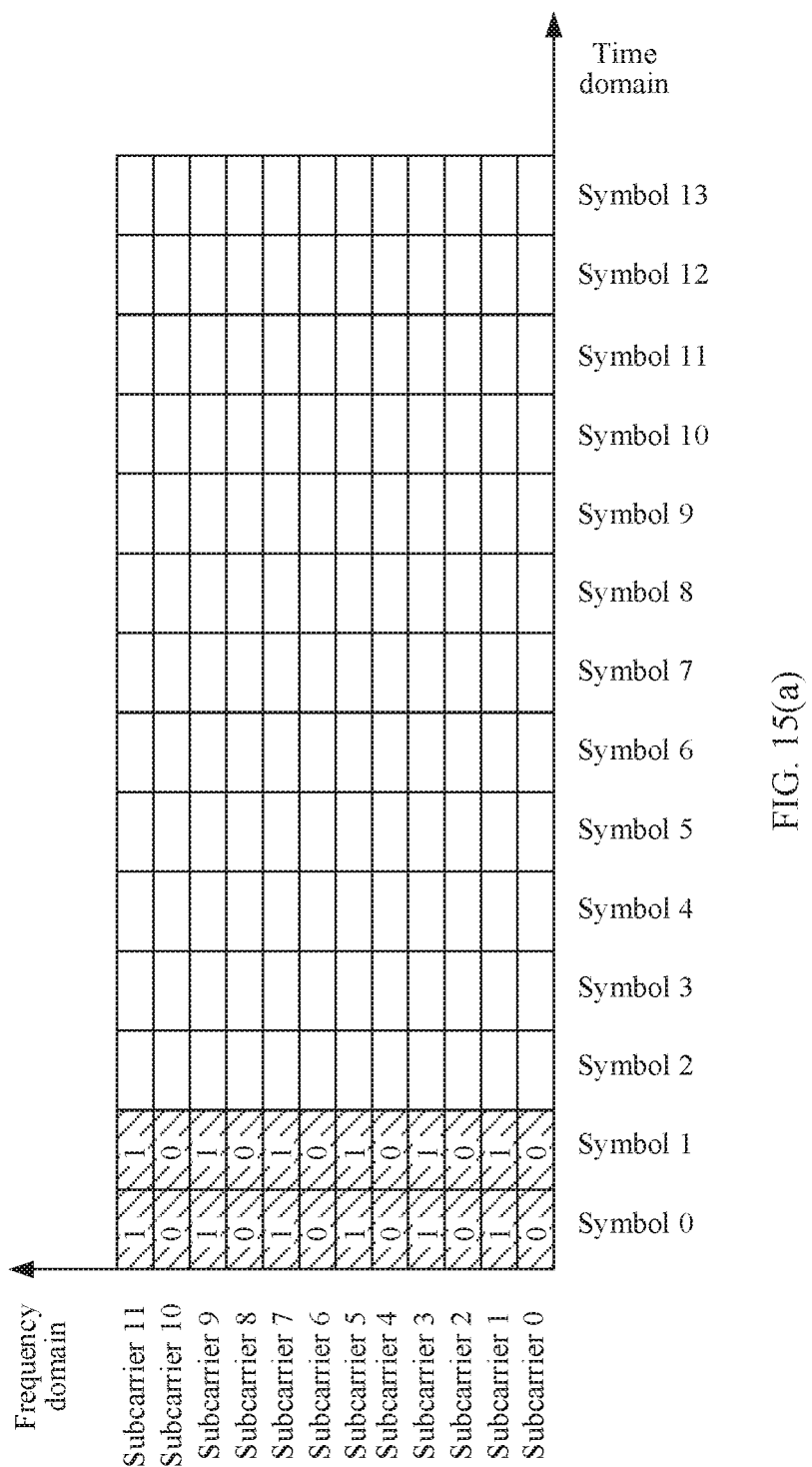
FIG. 15(a) and FIG. 15(b) are an example diagram of a reference signal pattern according to an embodiment of this application.
Figure 15B:
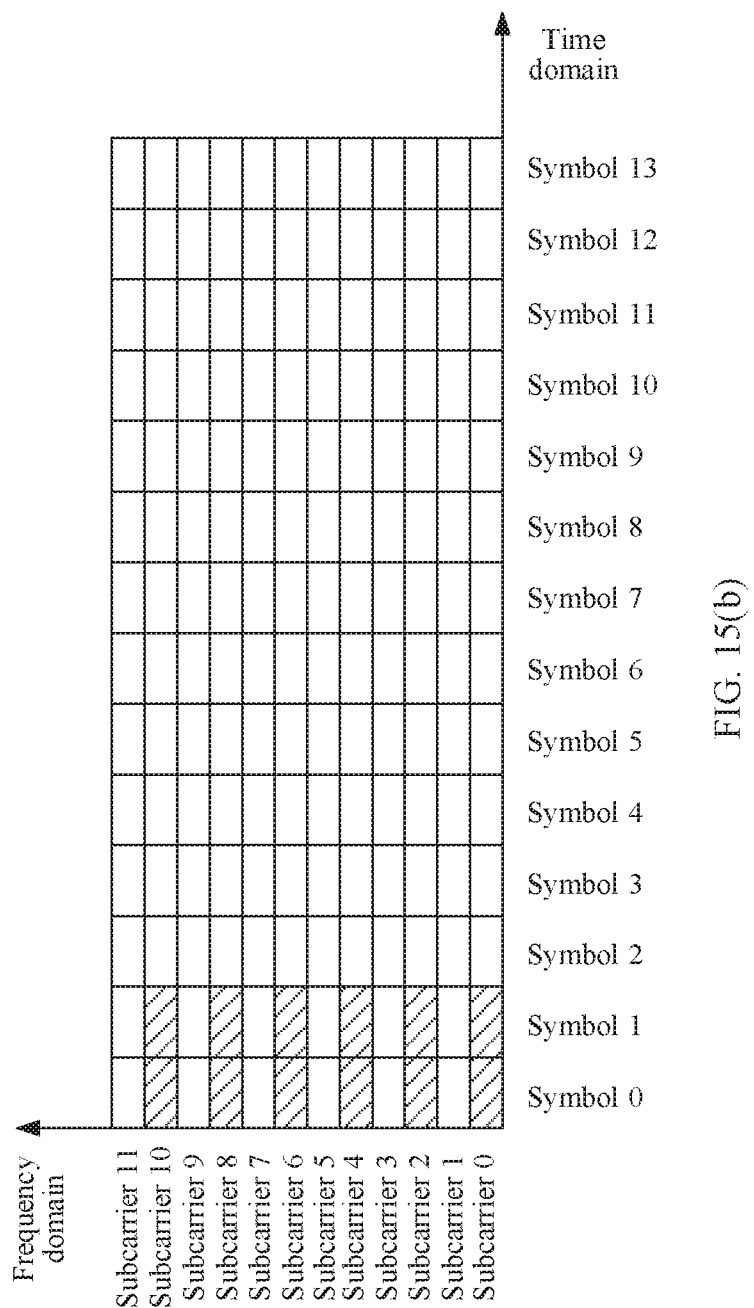

When the plurality of RSs are configured, resource locations of different RSs may be configured to be different. FIG. 15(a) and FIG. 15(b) shows an example of a reference signal pattern of two antenna ports. As shown in FIG. 15(a), a resource granularity corresponding to the reference signal pattern includes 288 REs, and the 288 REs correspond to 12 subcarriers in frequency domain and 14 symbols in time domain. In the reference signal pattern shown in FIG. 15(a) and FIG. 15(b), REs used to transmit a reference signal are filled with slashes. REs that are marked as (0) and that are used to transmit the reference signal in FIG. 15(a) correspond to an antenna port 0, and REs that are marked as (1) and that are used to transmit the reference signal in FIG. 15(a) correspond to an antenna port 1. In actual application, a quantity of antenna ports may alternatively be another positive integer, and the reference signal pattern may alternatively be another pattern. This is not limited in this application.

When the plurality of RSs are configured, resource locations of different RSs may be configured to be the same, and sequence values of the RSs are different. For example, the sequence values of the RSs are orthogonal. FIG. 15(b) shows an example of a reference signal pattern of two antenna ports. The two antenna ports are respectively an antenna port 0 and an antenna port 1. As shown in FIG. 15(*b*), a resource granularity corresponding to the reference signal pattern includes 288 REs, and the 288 REs correspond to 12 subcarriers in frequency domain and 14 symbols in time domain. In the reference signal pattern shown in FIG. 15(*b*), REs used to transmit reference signals of the antenna port 0 and the antenna port 1 are filled with slashes, resource locations of the RSs of the antenna port 0 and the antenna port 1 are the same, and sequence values of the RSs of the antenna port 0 and the antenna port 1 are different. In actual application, a quantity of antenna ports may alternatively be another positive integer, and the reference signal pattern may alternatively be another pattern. This is not limited in this application.

When the plurality of RSs are configured, if the resource locations of the plurality of RSs are the same, the sequence values of the plurality of RSs may be distinguished by using an OCC (orthogonal cover code) code. For example, based on the reference signal pattern shown in FIG. 15(*b*), for the antenna port 0 and the antenna port 1, on two REs that are used to transmit RSs and that correspond to one subcarrier: A sequence value of an RS corresponding to the antenna port 0 is an OCC code [1, 1] multiplied by a symbol a, that is, values of the RSs transmitted on the two REs are the same: a and a respectively. A sequence value of an RS corresponding to the antenna port 1 is an OCC code [1, −1] multiplied by the symbol a, that is, the value of RSs transmitted on the two REs are opposite: a and −a respectively, where a is a complex number.

In actual application, when a plurality of RSs are configured, a plurality of RSs corresponding to one reference signal pattern may include RSs with a same resource location, and may also include RSs with different resource locations. This is not limited in this application.

The base station may determine an antenna port based on the sending waveform and a correspondence between the sending waveform and the antenna port, and send the RS to the UE on the antenna port. The UE receives the RS, and determines the sending waveform based on the antenna port corresponding to the RS and the correspondence between the sending waveform and the antenna port. The correspondence between the sending waveform and the antenna port may be as follows: When the sending waveform is the CP-OFDM waveform, the antenna port is a first antenna port; or when the sending waveform is the DFT-s-OFDM waveform, the antenna port is a second antenna port. The first antenna port and the second antenna port are different.

For example, Table 2 shows the correspondence between the sending waveform and the antenna port. If determining that the sending waveform is CP-OFDM, the base station may determine, according to Table 2, that the antenna port used to send the RS and other data is 0.

TABLE 2

| Sending waveform | Antenna port |
|---|---|
| CP-OFDM waveform | 0, 1, 2, 3 |
| DFT-s-OFDM waveform | 4, 5, 6, 7 |

In the method, the UE may determine the correspondence between the antenna port and the sending waveform based on a pre-configuration, or may receive signaling sent by the base station and determine the correspondence between the antenna port and the sending waveform by using the signaling. This is not limited in the embodiment of this application.

Manner 2C:

The UE may determine the sending waveform based on a preprocessing codebook.

The base station may determine the preprocessing codebook based on the sending waveform and a correspondence between the sending waveform and the preprocessing codebook, and preprocess the input data based on the determined preprocessing codebook, to obtain the preprocessed output data. The UE receives the preprocessed output data, and determines the sending waveform based on a codebook of the preprocessed output data and the correspondence between the sending waveform and the preprocessing codebook. The correspondence between the sending waveform and the preprocessing codebook may be as follows: When the sending waveform is the CP-OFDM waveform, the preprocessing codebook is a first preprocessing codebook; or when the sending waveform is the DFT-s-OFDM waveform, the preprocessing codebook is a second preprocessing codebook. The first preprocessing codebook and the second preprocessing codebook are different.

In the method, the UE may determine the correspondence between the sending waveform and the preprocessing codebook based on a pre-configuration, or may receive signaling sent by the base station and determine the correspondence between the sending waveform and the preprocessing codebook by using the signaling. This is not limited in the embodiment of this application.

Third Sending Waveform Determining Manner:

If the transmit end is the UE, and the receive end is the base station, the base station and the UE perform uplink data transmission, the UE may also send data to the base station by using the CP-OFDM waveform or the DFT-s-OFDM waveform.

The UE may determine the sending waveform, and notify the base station of the determined sending waveform.

For example, the UE measures quality of a channel between the base station and the UE, and determines the sending waveform based on the quality of the channel. If the quality of the channel is greater than a threshold or is greater than or equal to a threshold, the UE determines that the sending waveform is CP-OFDM. Alternatively, if the quality of the channel is less than or equal to a threshold or is less than a threshold, the UE determines that the sending waveform is DFT-s-OFDM.

Optionally, a method in which the UE notifies the base station of the sending waveform is similar to the method in which the base station notifies the UE of the sending waveform in the second sending waveform determining manner. Details are not described herein again.

In the foregoing embodiment provided in this application, the method provided in this embodiment of this application is described from the perspectives of the transmit end and the receive end. To implement functions in the method provided in this embodiment of this application, the transmit end and the receive end may include a hardware structure and/or a software module, and the foregoing functions are implemented in a form of the hardware structure, the software module, or a combination of the hardware structure and the software module. Whether a function of the functions is performed by using the hardware structure, the software module, or the combination of the hardware structure and the software module depends on a specific application and a design constraint condition of the technical solutions.

Figure 16:
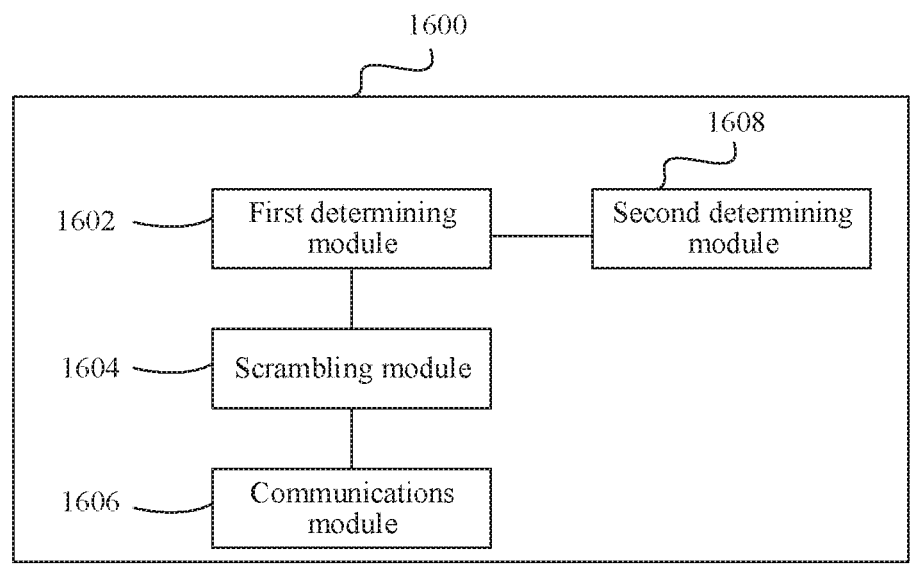
FIG. 16 is a schematic structural diagram of an apparatus according to an embodiment of this application.

FIG. 16 is a schematic structural diagram of an apparatus 1600 according to an embodiment of this application. The apparatus 1600 may be a transmit end, and can implement functions of a transmit end in a method provided in an embodiment of this application. The apparatus 1600 may alternatively be an apparatus in a transmit end, and the apparatus can support the transmit end in implementing functions of the transmit end in the method provided in the embodiment of this application. The apparatus 1600 may be a hardware structure, a software module, or a combination of the hardware structure and the software module. The apparatus 1600 may be implemented by using a chip system. In the embodiment of this application, the chip system may include a chip, or may include a chip and another discrete component.

As shown in FIG. 16, the apparatus 1600 includes a first determining module 1602, a scrambling module 1604, and a communications module 1606. The scrambling module 1604 is coupled to the first determining module 1602, and the scrambling module 1604 is coupled to the communications module 1606. The coupling In the embodiment of this application is an indirect coupling or a communications connection between apparatuses, units, or modules, and may be in an electrical form, a mechanical form, or another form, and is used for information exchange between the apparatuses, the units, or the modules.

The first determining module 1602 is configured to determine a scrambling manner based on a sending waveform. For example, the scrambling manner includes one or more of frequency domain scrambling, time domain scrambling, or time-frequency domain scrambling. For a method for determining the scrambling manner based on the sending waveform, refer to corresponding descriptions in the method embodiment of this application. Details are not described herein again.

The scrambling module 1604 is configured to: scramble to-be-scrambled data based on the scrambling manner, to obtain scrambled output data. For a method for scrambling the to-be-scrambled data based on the scrambling manner, refer to corresponding descriptions in the method embodiment of this application. Details are not described herein again.

The communications module 1606 is configured to send the scrambled output data. The communications module 1606 is used by the apparatus 1600 to communicate with another module, and may be a circuit, a component, an interface, a bus, a software module, a transceiver, or any other apparatus that can implement communication.

The apparatus 1600 may further include a second determining module 1608, configured to determine the sending waveform, and the sending waveform is used to send the scrambled output data. For a method in which the second determining module 1608 determines the sending waveform, refer to corresponding descriptions in the method embodiment of this application, for example, one or more of the first sending waveform determining manner to the third sending waveform determining manner. Details are not described herein again.

Figure 17:
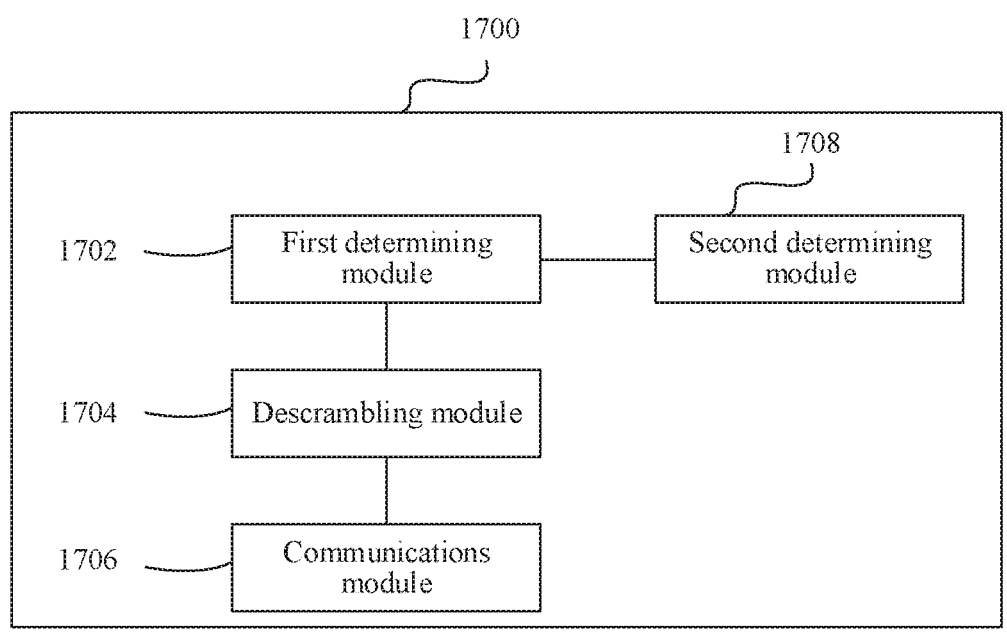
FIG. 17 is a schematic structural diagram of an apparatus according to an embodiment of this application.

FIG. 17 is a schematic structural diagram of an apparatus 1700 according to an embodiment of this application. The apparatus 1700 may be a receive end, and can implement functions of a receive end in a method provided in an embodiment of this application. The apparatus 1700 may alternatively be an apparatus in a receive end, and the apparatus can support the receive end in implementing functions of the receive end in the method provided in the embodiments of this application. The apparatus 1700 may be a hardware structure, a software module, or a combination of the hardware structure and the software module. The apparatus 1700 may be implemented by using a chip system.

As shown in FIG. 17, the apparatus 1700 includes a first determining module 1702, a descrambling module 1704, and a communications module 1706. The descrambling module 1704 is coupled to the first determining module 1702, and the descrambling module 1704 is coupled to the communications module 1706.

The first determining module 1702 is configured to determine a scrambling manner based on a transmission waveform. The scrambling manner includes at least one of frequency domain scrambling, time domain scrambling, and time-frequency domain scrambling. For a method for determining the scrambling manner based on the transmission waveform, refer to corresponding descriptions in the method embodiment of this application. Details are not described herein again.

The communications module 1706 is configured to receive scrambled data. The communications module 1706 is used by the apparatus 1700 to communicate with another module, and may be a circuit, a component, an interface, a bus, a software module, a transceiver, or any other apparatus that can implement communication.

The descrambling module 1704 is configured to descramble the received scrambled data based on the scrambling manner.

The apparatus 1700 may further include a second determining module 1708, configured to determine the transmission waveform. For a method in which the second determining module 1708 determines the transmission waveform, refer to corresponding descriptions in the method embodiment of this application, for example, similar to corresponding descriptions in the first sending waveform determining manner to the third sending waveform determining manner. Details are not described herein again.

Figure 18:
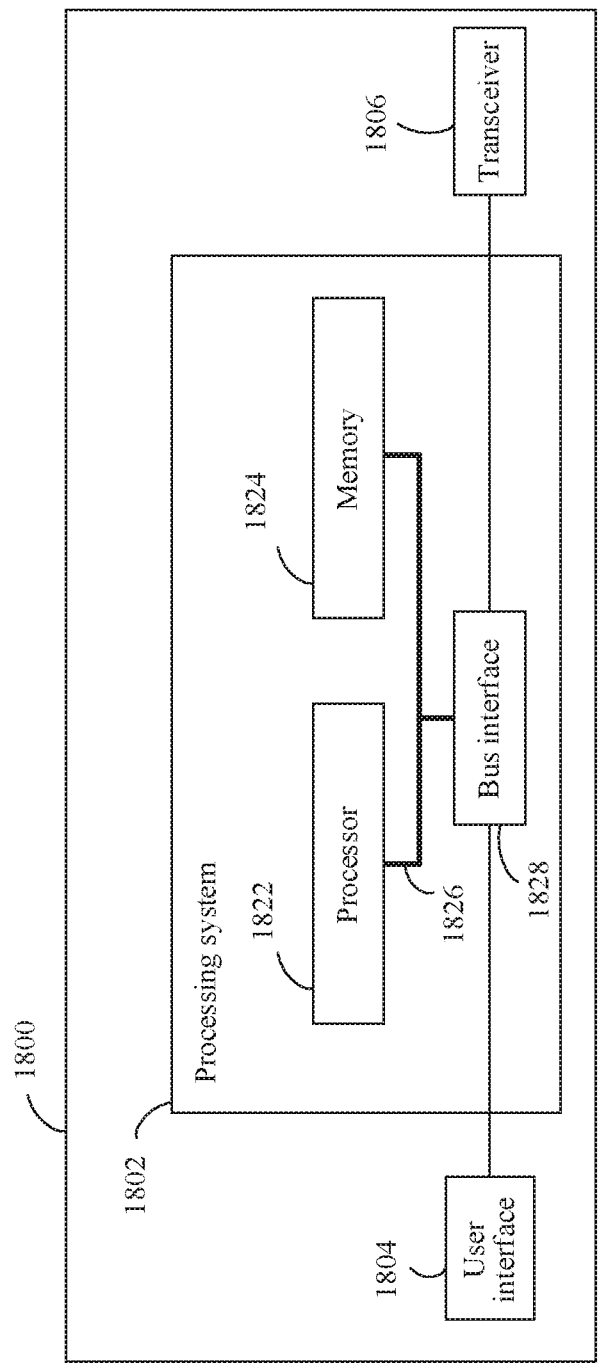
FIG. 18 is a schematic structural diagram of an apparatus according to an embodiment of this application.

FIG. 18 is a schematic structural diagram of an apparatus 1800 according to an embodiment of this application. The apparatus 1800 may be a transmit end, and can implement functions of a transmit end in a method provided in an embodiment of this application. The apparatus 1800 may alternatively be an apparatus in a transmit end, and the apparatus can support the transmit end in implementing functions of the transmit end in the method provided in the embodiments of this application.

As shown in FIG. 18, the apparatus 1800 includes a processing system 1802, configured to implement or configured to support the transmit end in implementing the functions of the transmit end in the method provided in the embodiments of this application. The processing system 1802 may be a circuit, and the circuit may be implemented by using a chip system. The processing system 1802 includes one or more processors 1822 that may be configured to implement or configured to support the transmit end in implementing the functions of the transmit end in the method provided in the embodiments of this application. When the processing system 1802 includes another apparatus besides the processor, the processor 1822 may be further configured to manage the another apparatus included in the processing system 1802. For example, the another apparatus may be one or more of the following: a memory 1824, a bus 1826, and a bus interface 1828.

In the embodiment of this application, the processor may be a central processing unit (CPU), a general purpose processor, a network processor (NP), a digital signal processor (DSP), a microprocessor, a microcontroller, a programmable logic device (PLD), or any combination thereof.

The processing system 1802 may further include one or more memories 1824, configured to store a program instruction and/or data. Further, the memory 1824 may be further included in the processor 1822. If the processing system 1802 includes the memory 1824, the processor 1822 may be coupled to the memory 1824. The processor 1822 may cooperate with the memory 1824. The processor 1822 may execute the program instruction stored in the memory 1824. When executing the program instruction stored in the memory 1824, the processor 1822 may implement or support the transmit end in implementing the functions of the transmit end in the method provided in the embodiment of this application. The processor 1822 may further read the data stored in the memory 1824. The memory 1824 may further store data obtained when the processor 1822 executes the program instruction.

In the embodiment of this application, the memory includes a volatile memory, such as a random-access memory (RAM). The memory may also include a nonvolatile memory, such as a flash memory, a hard disk (hard disk drive, HDD), or a solid-state drive (SSD). The memory may further include a combination of the foregoing types of memories. The memory may further include any other apparatus having a storage function, for example, a circuit, a component, or a software module.

When the processor 1822 implements or supports the transmit end in implementing the method provided in the embodiment of this application, the processor may determine a scrambling manner based on a sending waveform. The scrambling manner includes at least one of frequency domain scrambling, time domain scrambling, and time-frequency domain scrambling. The processor may further scramble to-be-scrambled data based on the scrambling manner, to obtain scrambled output data, and send the scrambled output data. The processor may further determine the sending waveform used to send the scrambled output data. When the processor 1822 implements or supports the transmit end in implementing the method provided in the embodiment of this application, for a specific method used by the processor 1822, refer to the descriptions in the method embodiment of this application. Details are not described herein again.

The processing system 1802 may further include the bus interface 1828, configured to provide an interface between the bus 1826 and another apparatus.

The apparatus 1800 may further include a transceiver 1806, configured to communicate with another communications device by using a transmission medium, so that another apparatus in the apparatus 1800 can communicate with the another communications device. The another apparatus may be the processing system 1802. For example, the another apparatus in the apparatus 1800 may communicate with the another communications device by using the transceiver 1806, and receive and/or send corresponding information. Alternatively, it may be described as follows: The another apparatus in the apparatus 1800 may receive corresponding information, where the corresponding information is received by the transceiver 1806 by using the transmission medium, and the corresponding information may be exchanged between the transceiver 1806 and the another apparatus in the apparatus 1800 by using the bus interface 1828 or by using the bus interface 1828 and the bus 1826; and/or the another apparatus in the apparatus 1800 may send corresponding information, where the corresponding information is sent by the transceiver 1806 by using the transmission medium, and the corresponding information may be exchanged between the transceiver 1806 and the another apparatus in the apparatus 1800 by using the bus interface 1828 or by using the bus interface 1828 and the bus 1826.

The apparatus 1800 may further include a user interface 1804. The user interface 1804 is an interface between a user and the apparatus 1800, and may be configured to perform information exchange between the user and the apparatus 1800. For example, the user interface 1804 may be at least one of a keyboard, a mouse, a display, a speaker, a microphone, and a joystick.

The foregoing mainly describes, from the perspective of the apparatus 1800, an apparatus structure provided in the embodiments of this application. In the apparatus, the processing system 1802 includes the processor 1822, may further include one or more of the memory 1824, the bus 1826, and the bus interface 1828, and is configured to implement the method provided in the embodiment of this application. The processing system 1802 also falls within the protection scope of this application.

Figure 19:
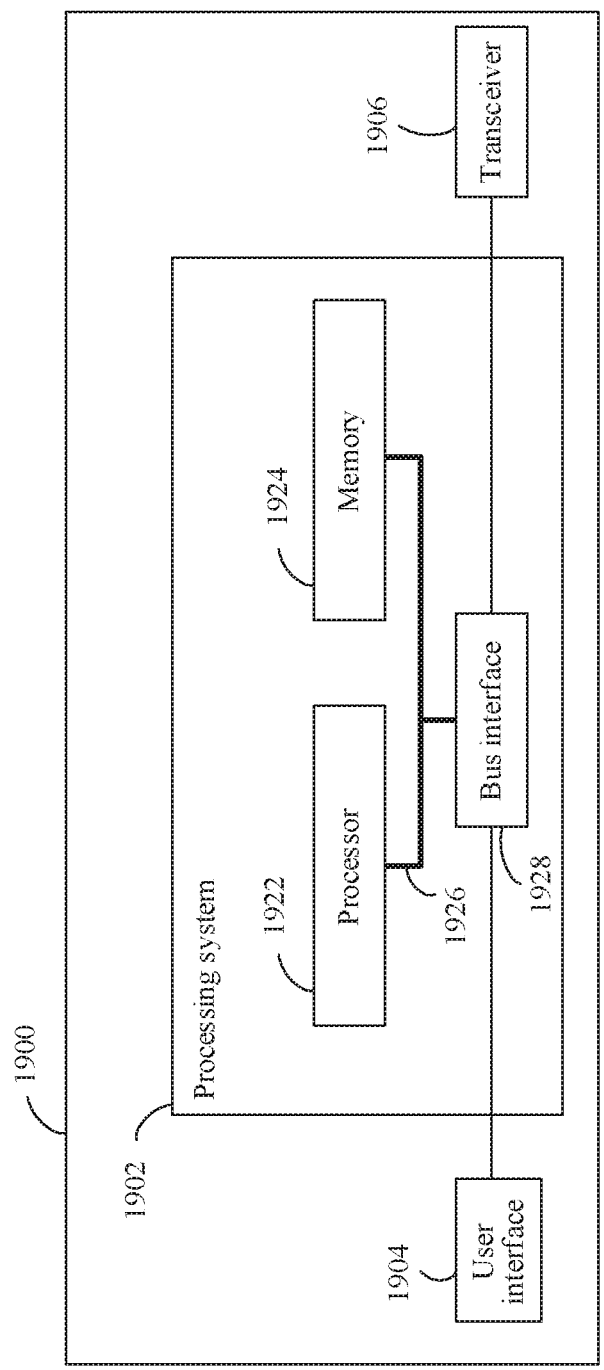
FIG. 19 is a schematic structural diagram of an apparatus according to an embodiment of this application.

FIG. 19 is a schematic structural diagram of an apparatus 1900 according to an embodiment of this application. The apparatus 1900 may be a receive end, and can implement functions of a receive end in a method provided in an embodiment of this application. The apparatus 1900 may alternatively be an apparatus in a receive end, and the apparatus can support the receive end in implementing functions of the receive end in the method provided in the embodiment of this application.

As shown in FIG. 19, the apparatus 1900 includes a processing system 1902, configured to implement or configured to support the receive end in implementing the functions of the receive end in the method provided in the embodiment of this application. The processing system 1902 may be a circuit, and the circuit may be implemented by using a chip system. The processing system 1902 includes one or more processors 1922 that may be configured to implement or configured to support the receive end in implementing the functions of the receive end in the method provided in the embodiment of this application. When the processing system 1902 includes another apparatus besides the processor, the processor 1922 may be further configured to manage the another apparatus included in the processing system 1902. For example, the another apparatus may be one or more of the following: a memory 1924, a bus 1926, and a bus interface 1928.

The processing system 1902 may further include one or more memories 1924, configured to store a program instruction and/or data. Further, the memory 1924 may be further included in the processor 1922. If the processing system 1902 includes the memory 1924, the processor 1922 may be coupled to the memory 1924. The processor 1922 may cooperate with the memory 1924. The processor 1922 may execute the program instruction stored in the memory 1924. When executing the program instruction stored in the memory 1924, the processor 1922 may implement or support the receive end in implementing the functions of the receive end in the method provided in the embodiment of this application. The processor 1922 may further read the data stored in the memory 1924. The memory 1924 may further store data obtained when the processor 1922 executes the program instruction.

When the processor 1922 implements or supports the receive end in implementing the method provided in the embodiment of this application, the processor may receive scrambled data, determine a scrambling manner based on a transmission waveform, and descramble the received scrambled data based on the scrambling manner. The scrambling manner includes at least one of frequency domain scrambling, time domain scrambling, and time-frequency domain scrambling. The processor may further determine the transmission waveform used to transmit scrambled output data. When the processor 1922 implements or supports the receive end in implementing the method provided in the embodiment of this application, for a specific method used by the processor 1922, refer to the descriptions in the method embodiment of this application. Details are not described herein again.

The processing system 1902 may further include the bus interface 1928, configured to provide an interface between the bus 1926 and another apparatus.

The apparatus 1900 may further include a transceiver 1906, configured to communicate with another communications device by using a transmission medium, so that another apparatus in the apparatus 1900 can communicate with the another communications device. The another apparatus may be the processing system 1902. For example, the another apparatus in the apparatus 1900 may communicate with the another communications device by using the transceiver 1906, and receive and/or send corresponding information. Alternatively, it may be described as follows: The another apparatus in the apparatus 1900 may receive corresponding information, where the corresponding information is received by the transceiver 1906 by using the transmission medium, and the corresponding information may be exchanged between the transceiver 1906 and the another apparatus in the apparatus 1900 by using the bus interface 1928 or by using the bus interface 1928 and the bus 1926; and/or the another apparatus in the apparatus 1900 may send corresponding information, where the corresponding information is sent by the transceiver 1906 by using the transmission medium, and the corresponding information may be exchanged between the transceiver 1906 and the another apparatus in the apparatus 1900 by using the bus interface 1928 or by using the bus interface 1928 and the bus 1926.

The apparatus 1900 may further include a user interface 1904. The user interface 1904 is an interface between a user and the apparatus 1900, and may be configured to perform information exchange between the user and the apparatus 1900. For example, the user interface 1904 may be at least one of a keyboard, a mouse, a display, a speaker, a microphone, and a joystick.

The foregoing mainly describes, from the perspective of the apparatus 1900, an apparatus structure provided in the embodiment of this application. In the apparatus, the processing system 1902 includes the processor 1922, may further include one or more of the memory 1924, the bus 1926, and the bus interface 1928, and is configured to implement the method provided in the embodiment of this application. The processing system 1902 also falls within the protection scope of this application.

In the apparatus embodiments of this application, module division of an apparatus is logical function division and may be other division in actual implementation. For example, all function modules of the apparatus may be integrated into one module, or may be separated from each other, or at least two function modules may be integrated into one module.

All or some of the foregoing methods in the embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general purpose computer, a dedicated computer, a computer network, a network device, a user device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing embodiments are merely intended to describe the technical solutions of this application, but not to limit the protection scope of this application. Modification, equivalent replacement, or improvement made without departing from the basic of the technical solutions of this application shall fall within the protection scope of this application.

What is claimed is:

1. A method, comprising:
   determining respective types of sending waveforms of respective to-be-scrambled data from a plurality of types of waveforms, wherein the plurality of types of waveforms comprise a discrete Fourier transform spreading orthogonal frequency division multiplexing (DFT-s-OFDM) waveform and a cyclic prefix orthogonal frequency division multiplexing (CP-OFDM) waveform, and wherein determining the respective types of sending waveforms of respective to-be-scrambled data from the plurality of types of waveforms comprises:
   determining that a first sending waveform of first to-be-scrambled data is the DFT-s-OFDM waveform; and
   determining that a second sending waveform of second to-be-scrambled data is the CP-OFDM waveform;
   determining respective scrambling manners based on the respective types of sending waveforms, wherein determining the respective scrambling manners based on the respective types of sending waveforms comprises:
   determining a first scrambling manner to be a time domain scrambling in response to determining that (i) the first sending waveform is the DFT-s-OFDM waveform and (ii) a type of a first preprocessing codebook that is used to generate the first to-be-scrambled data is a first extended sequence; and
   determining a second scrambling manner to be one of the time domain scrambling, frequency domain scrambling, or time-frequency domain scrambling in response to determining that the second sending waveform is the CP-OFDM waveform;
   scrambling the first to-be-scrambled data based on the first scrambling manner using a time domain scrambling sequence, to obtain first scrambled output data; and
   sending the first scrambled output data.

2. The method according to claim 1, further comprising:
scrambling the second to-be-scrambled data based on the second scrambling manner, to obtain second scrambled output data; and
sending the second scrambled output data.

3. The method according to claim 2, wherein determining the second scrambling manner comprises:
in response to determining that the second sending waveform is the CP-OFDM waveform and a type of a second preprocessing codebook is a second extended sequence, determining the second scrambling manner is the frequency domain scrambling.

4. The method according to claim 1, wherein the time domain scrambling sequence is determined based on a first sequence, wherein an initial value of the first sequence is determined based on a user equipment (UE) group identifier of UE, and wherein the first scrambled output data is data corresponding to the UE.

5. An apparatus, comprising:
at least one processor; and
a memory coupled to the at least one processor and storing programming instructions for execution by the at least one processor, wherein the programming instructions instruct the at least one processor to perform operations comprising:
determining respective types of sending waveforms of respective to-be-scrambled data from a plurality of types of waveforms, wherein the plurality of types of waveforms comprise a discrete Fourier transform spreading orthogonal frequency division multiplexing (DFT-s-OFDM) waveform and a cyclic prefix orthogonal frequency division multiplexing (CP-OFDM) waveform, and wherein determining the respective types of sending waveforms of respective to-be-scrambled data from the plurality of types of waveforms comprises:
determining that a first sending waveform of first to-be-scrambled data is the DFT-s-OFDM waveform; and
determining that a second sending waveform of second to-be-scrambled data is the CP-OFDM waveform;
determining respective scrambling manners based on the respective types of sending waveforms, wherein determining the respective scrambling manners based on the respective types of sending waveforms comprises:
determining a first scrambling manner to be a time domain scrambling in response to determining that (i) the first sending waveform is the DFT-s-OFDM waveform and (ii) a type of a first preprocessing codebook that is used to generate the first to-be-scrambled data is a first extended sequence; and
determining a second scrambling manner to be one of the time domain scrambling, frequency domain scrambling, or time-frequency domain scrambling in response to determining that the second sending waveform is the CP-OFDM waveform;
scrambling the first to-be-scrambled data based on the first scrambling manner, to obtain first scrambled output data using a time domain scrambling sequence; and
sending the first scrambled output data.

6. The apparatus according to claim 5, wherein the operations further comprise:
scrambling the second to-be-scrambled data based on the second scrambling manner, to obtain second scrambled output data; and
sending the second scrambled output data.

7. The apparatus according to claim 6, wherein determining the second scrambling manner comprises:
in response to determining that the second sending waveform is the CP-OFDM waveform and a type of a second preprocessing codebook is a second extended sequence, determining the second scrambling manner is the frequency domain scrambling.

8. The apparatus according to claim 5, wherein the time domain scrambling sequence is determined based on a first sequence, wherein an initial value of the first sequence is determined based on a user equipment (UE) group identifier of UE, and wherein the first scrambled output data is data corresponding to the UE.

9. A method, comprising:
receiving first scrambled data;
determining respective types of transmission waveforms of respective scrambled data from a plurality of types of waveforms, wherein the plurality of types of waveforms comprise a discrete Fourier transform spreading orthogonal frequency division multiplexing (DFT-s-OFDM) waveform and a cyclic prefix orthogonal frequency division multiplexing (CP-OFDM) waveform, and wherein determining the respective types of transmission waveforms of respective scrambled data from the plurality of types of waveforms comprises:
determining that a first transmission waveform of the first scrambled data is the DFT-s-OFDM waveform; and
determining that a second transmission waveform of second scrambled data is the CP-OFDM waveform;
determining respective scrambling manners based on the respective types of transmission waveforms, wherein determining the respective scrambling manners based on the respective types of transmission waveforms comprises:
determining a first scrambling manner to be a time domain scrambling in response to determining that (i) the first transmission waveform is the DFT-s-OFDM waveform and (ii) a type of a first preprocessing codebook that is used to generate the first scrambled data is a first extended sequence; and
determining a second scrambling manner to be one of the time domain scrambling, frequency domain scrambling, or time-frequency domain scrambling in response to determining that the second transmission waveform is the CP-OFDM waveform; and
descrambling the first scrambled data based on the first scrambling manner.

10. The method according to claim 9, further comprising:
receiving the second scrambled data; and
descrambling the second scrambled data based on the second scrambling manner.

11. The method according to claim 10, wherein determining the second scrambling manner comprises:
in response to determining that the second transmission waveform is the CP-OFDM waveform and a type of a second preprocessing codebook is a second extended sequence, determining the second scrambling manner is the frequency domain scrambling.

12. The method according to claim 9, wherein the time domain scrambling sequence is determined based on a first sequence, wherein an initial value of the first sequence is determined based on a user equipment (UE) group identifier of UE, and wherein the first scrambled data is data corresponding to the UE.

13. The method according to claim 2, wherein a frequency domain scrambling sequence of the frequency domain scrambling is determined based on a second sequence, wherein an initial value of the second sequence is determined based on a UE group identifier of UE.

14. The apparatus according to claim 6, wherein a frequency domain scrambling sequence of the frequency domain scrambling is determined based on a second sequence, wherein an initial value of the second sequence is determined based on a UE group identifier of UE.

15. The method according to claim 10, wherein a frequency domain scrambling sequence of the frequency domain scrambling is determined based on a second sequence, wherein an initial value of the second sequence is determined based on a UE group identifier of UE.

16. The method according to claim 1, wherein determining the first sending waveform is the DFT-s-OFDM waveform comprises:

determining quality of a channel; and in response to determining that the quality of the channel is less than or equal to a threshold, determining the first sending waveform is the DFT-s-OFDM waveform.

17. The method according to claim 1, wherein determining the first sending waveform is the DFT-s-OFDM waveform comprises:

determining a sequence of a reference signal; and in response to determining that the sequence of the reference signal is Zadoff-Chu (ZC) sequence, determining the first sending waveform is the DFT-s-OFDM waveform.

\* \* \* \* \*